(12) United States Patent
Yu et al.

(10) Patent No.: US 11,680,009 B2
(45) Date of Patent: Jun. 20, 2023

(54) GLASS-CERAMIC AND SUBSTRATE THEREOF

(71) Applicant: CDGM GLASS CO., LTD, Sichuan (CN)

(72) Inventors: Tianlai Yu, Sichuan (CN); Baoping Yuan, Sichuan (CN); Xiaobing Nie, Sichuan (CN)

(73) Assignee: CDGM GLASS CO., LTD, Sichuan (CN)

( * ) Notice: Subject to any disclaimer, the term of this patent is extended or adjusted under 35 U.S.C. 154(b) by 130 days.

(21) Appl. No.: 16/768,633

(22) PCT Filed: Nov. 19, 2018

(86) PCT No.: PCT/CN2018/116149
§ 371 (c)(1),
(2) Date: Mar. 23, 2021

(87) PCT Pub. No.: WO2019/105250
PCT Pub. Date: Jun. 6, 2019

(65) Prior Publication Data
US 2022/0048810 A1 Feb. 17, 2022

(30) Foreign Application Priority Data

Dec. 1, 2017 (CN) .................. 201711247883.6
Dec. 1, 2017 (CN) .................. 201711248375.X

(51) Int. Cl.
*C03C 10/12* (2006.01)
*C03C 10/14* (2006.01)
*C03C 10/00* (2006.01)

(52) U.S. Cl.
CPC ...... *C03C 10/0027* (2013.01); *C03C 10/0009* (2013.01); *C03C 10/0054* (2013.01); *C03C 2204/00* (2013.01)

(58) Field of Classification Search
CPC .................. C03C 10/0009; C03C 10/0027
See application file for complete search history.

(56) References Cited

U.S. PATENT DOCUMENTS

| | | | |
|---|---|---|---|
| 4,391,914 A | 7/1983 | Beall | |
| 8,043,706 B2 * | 10/2011 | Goto | C03C 10/0045 428/432 |
| 8,071,493 B2 * | 12/2011 | Yagi | C03C 10/0054 428/846.9 |
| 8,093,167 B2 * | 1/2012 | Yagi | C03C 3/112 501/63 |
| 10,239,780 B2 * | 3/2019 | Beall | C03B 32/02 |
| 10,626,046 B2 * | 4/2020 | Beall | C03C 3/097 |
| 10,723,649 B2 * | 7/2020 | Beall | C03C 10/0054 |
| 10,913,681 B2 * | 2/2021 | Yuan | C03C 3/097 |
| 11,161,776 B2 * | 11/2021 | Beall | C03C 4/18 |
| 2009/0118113 A1 * | 5/2009 | Yagi | G11B 5/73913 501/63 |
| 2011/0030423 A1 * | 2/2011 | Johannes | C03C 3/112 501/134 |
| 2011/0136651 A1 * | 6/2011 | Yagi | C03C 3/112 501/7 |
| 2014/0045674 A1 * | 2/2014 | Johannes | A61K 6/78 501/17 |
| 2016/0102010 A1 * | 4/2016 | Beall | C03C 21/002 501/4 |
| 2017/0144921 A1 * | 5/2017 | Beall | C03C 10/0054 |
| 2018/0099901 A1 * | 4/2018 | Beally | C03C 3/097 |
| 2019/0048318 A1 * | 2/2019 | Deng | C03C 3/111 |
| 2019/0160201 A1 * | 5/2019 | Deng | C03C 10/16 |
| 2019/0161395 A1 * | 5/2019 | Beall | C03C 4/18 |
| 2020/0002221 A1 * | 1/2020 | Beall | C03B 32/02 |
| 2020/0055764 A1 * | 2/2020 | Duffy | C03C 10/0027 |
| 2020/0131080 A1 * | 4/2020 | Yuan | C03C 10/0027 |
| 2020/0231491 A1 * | 7/2020 | Beall | C03C 3/097 |
| 2020/0354263 A1 * | 11/2020 | Beall | C03C 4/18 |
| 2021/0002164 A1 * | 1/2021 | Beall | C03C 21/002 |
| 2021/0114920 A1 * | 4/2021 | Beall | C03C 10/0027 |

FOREIGN PATENT DOCUMENTS

| | | |
|---|---|---|
| CN | 105683109 A | 6/2016 |
| CN | 107001120 A | 8/2017 |
| CN | 107902909 A | 4/2018 |
| WO | 0034196 A2 | 6/2000 |
| WO | 0034196 A3 | 11/2000 |

* cited by examiner

*Primary Examiner* — Karl E Group
(74) *Attorney, Agent, or Firm* — Novick, Kim & Lee, PLLC, dba NKL Law; Allen Xue

(57) ABSTRACT

A glass ceramic contains the following components by wt %: 60 to 80% of $SiO_2$; 4 to 20% of $Al_2O_3$; 0 to 15% of $Li_2O$; more than 0 but less than or equal to 12% of $Na_2O$; 0 to 5% of $K_2O$; more than 0 but less than or equal to 5% of $ZrO_2$; 0 to 5% of $P_2O_5$; and 0 to 10% of $TiO_2$. A crystalline phase contains at least one of $R_2SiO_3$, $R_2Si_2O_5$, $R_2TiO_3$, $R_4Ti_5O_{12}$, $R_3PO_3$, $RAlSi_2O_6$, $RAlSiO_4O_{10}$, $R_2Al_2Si_2O_8$, $R_4Al_4Si_5O_{18}$, quartz and quartz solid solution. With a liquidus temperature below 1,450° C., a thermal conductivity above 2 w/m·k, and a Vickers hardness above 600 kgf/mm2, the glass ceramic is applicable to portable electronic devices and optical devices.

23 Claims, No Drawings

US 11,680,009 B2

GLASS-CERAMIC AND SUBSTRATE THEREOF

TECHNICAL FIELD

The present invention relates to a glass ceramic and a substrate using the glass ceramic as a matrix. In particular, the present invention relates to a glass ceramic and substrate applicable to protective components such as portable electronic devices or optical devices and having high thermal conductivity and high strength.

BACKGROUND

Back covers are required for portable electronic devices such as smart phones, tablet PCs and other optical devices to protect internal electronic devices. Protective materials for the back covers, especially for electronic devices requiring wireless signals should have relatively high thermal conductivity, individualized colors and relatively high strength, can be used in harsh environments, and have good processing performance. In the past, metals were usually used as the protective materials for the back covers, but metal back covers would seriously affect reception of signals and could only be designed as sectional type. With development of 5G signals, the metal back covers are no longer feasible.

Ceramic materials have good texture and relatively high thermal conductivity without impact on signals, but have poor processability and higher cost compared with glass. At present, simple glass has low thermal conductivity and insufficient strength, which restrains its use as a back cover material for electronic devices.

Glass ceramic, also known as microcrystalline glass, separates out crystals in glass by heat treatment. Through internal dispersed crystals, glass ceramic can have physical properties unavailable in glass. Examples include mechanical strength such as Young's modulus and fracture toughness, etching properties for acidic or alkaline chemicals, thermal properties such as thermal expansion coefficient, increase and disappearance of glass transition temperature. Glass ceramic has higher mechanical properties and can improve thermal conductivity of glass due to formation of microcrystals in the glass. However, the glass ceramic in the past is not applicable to the protective materials due to poor thermal conductivity and strength. In addition, the conventional glass ceramic is rather unfit to be used as the protective material due to low productivity as a result of high viscosity or high devitrification resistance of raw glass.

Japanese Patent Document (made public under special permission) No. 2014-114200 discloses a glass ceramic substrate for information recording media. After chemical tempering, the glass ceramic substrate is unable to obtain a sufficient compressive stress and cannot form a deeper stress layer.

SUMMARY

A technical problem to be solved by the present invention is to provide a glass ceramic and substrate with relatively high thermal conductivity and strength.

The technical solution of the invention for solving the technical problem is as follows: a glass ceramic, contains the following components by wt %: 60 to 80% of $SiO_2$; 4 to 20% of $Al_2O_3$; 0 to 15% of $Li_2O$; more than 0 but less than or equal to 12% of $Na_2O$; 0 to 5% of $K_2O$; more than 0 but less than or equal to 5% of $ZrO_2$; 0 to 5% of $P_2O_5$; and 0 to 10% of $TiO_2$, wherein a crystalline phase contains at least one selected from $R_2SiO_3$, $R_2Si_2O_5$, $R_2TiO_3$, $R_4Ti_5O_{12}$, $R_3PO_3$, $RAlSi_2O_6$, $RAlSiO_4O_{10}$, $R_2Al_2Si_2O_8$, $R_4Al_4Si_5O_{18}$, quartz and quartz solid solution, and R is at least one selected from Li, Na and K.

Further, the glass ceramic also contains 0 to 5% of $B_2O_3$; and/or 0 to 2% of MgO; and/or 0 to 2% of ZnO; and/or 0 to 5% of CaO; and/or 0 to 5% of BaO; and/or 0 to 3% of FeO; and/or 0 to 2% of $SnO_2$; and/or 0 to 5% of SrO; and/or 0 to 10% of $La_2O_3$; and/or 0 to 10% of $Y_2O_3$; and/or 0 to 10% of $Nb_2O_5$; and/or 0 to 10% of $Ta_2O_5$; and/or 0 to 5% of $WO_3$.

A glass ceramic, is composed of the following components by wt %: 60 to 80% of $SiO_2$; 4 to 20% of $Al_2O_3$; 0 to 15% of $Li_2O$; more than 0 but less than or equal to 12% of $Na_2O$; more than 0 but less than or equal to 5% of $ZrO_2$; 0 to 5% of $P_2O_5$; 0 to 10% of $TiO_2$; 0 to 5% of $B_2O_3$; 0 to 5% of $K_2O$; 0 to 2% of MgO; 0 to 2% of ZnO; 0 to 5% of CaO; 0 to 5% of BaO; 0 to 3% of FeO; 0 to 2% of $SnO_2$; 0 to 5% of SrO; 0 to 10% of $La_2O_3$; 0 to 10% of $Y_2O_3$; 0 to 10% of $Nb_2O_5$; 0 to 10% of $Ta_2O_5$; 0 to 5% of $WO_3$; and 0 to 5% of a clarificant, wherein a crystalline phase contains at least one selected from $R_2SiO_3$, $R_2Si_2O_5$, $R_2TiO_3$, $R_4Ti_5O_{12}$, $R_3PO_3$, $RAlSi_2O_6$, $RAlSiO_4O_{10}$, $R_2Al_2Si_2O_8$, $R_4Al_4Si_5O_{18}$, quartz and quartz solid solution, and R is at least one selected from Li, Na and K.

Further, $SiO_2$ accounts for 65 to 78%; and/or $Al_2O_3$ accounts for 5 to 18%; and/or 0 to 12% of $Li_2O$; and/or $Na_2O$ accounts for 0.5 to 10%; and/or $ZrO_2$ accounts for 0.4 to 3%; and/or $P_2O_5$ accounts for 0.4 to 3%; and/or $B_2O_3$ accounts for 0 to 4%; and/or $K_2O$ accounts for 0.5 to 4%; and/or MgO accounts for more than 0 but less than or equal to 2%; and/or ZnO accounts for more than 0 but less than or equal to 2%; and/or CaO accounts for 0 to 4%; and/or BaO accounts for 0 to 4%; and/or FeO accounts for 0 to 1%; and/or $SnO_2$ accounts for 0.01 to 1%; and/or SrO accounts for 0 to 3%; and/or $La_2O_3$ accounts for 0 to 9%; and/or $Y_2O_3$ accounts for 0 to 9%; and/or $Nb_2O_5$ accounts for 0 to 8%; and/or $Ta_2O_5$ accounts for 0 to 8%; and/or $WO_3$ accounts for 0 to 2%; and/or the clarificant contains $As_2O_3$, $Sb_2O_3$ and $CeO_2$ and at least one selected from the group consisting of F, Cl, NOx and SOx with a content of 0 to 5%.

Further, $SiO_2/Li_2O$ ratio is 4 to 10; and/or $ZrO_2/Li_2O$ ratio is 0 to 0.5; and/or $Al_2O_3/(Na_2O+Li_2O)$ ratio is 0.5 to 2; and/or $Li_2O/Na_2O$ ratio is 0.8 to 8.

Further, $SiO_2$ accounts for 68 to 75%; and/or $Al_2O_3$ accounts for 6 to 15%; and/or $Li_2O$ accounts for 6 to 10%; and/or $Na_2O$ accounts for 2 to 8%; and/or $ZrO_2$ accounts for 0.8 to 2%; and/or $P_2O_5$ accounts for 0.8 to 2%; and/or $TiO_2$ accounts for 1 to 4%; and/or $B_2O_3$ accounts for more than 0% but less than 2%; and/or $K_2O$ accounts for 0.8 to 3%; and/or CaO accounts for 0 to 3%; and/or BaO accounts for 0 to 3%; and/or $SnO_2$ accounts for 0.05 to 0.4%; and/or SrO accounts for 0 to 1%; and/or $La_2O_3$ accounts for more than 0 but less than or equal to 8%; and/or $Y_2O_3$ accounts for more than 0 but less than or equal to 8%; and/or $Nb_2O_5$ accounts for 0 to 5%; and/or $Ta_2O_5$ accounts for 0 to 5%; and/or $WO_3$ accounts for 0 to 1%; and/or the clarificant accounts for 0 to 2%.

Further, $SiO_2/Li_2O$ ratio is 4.5 to 9.5; and/or $ZrO_2/Li_2O$ ratio is more than 0 but less than 0.35; and/or $Al_2O_3/(Na_2O+Li_2O)$ ratio is 0.7 to 1.8; and/or $Li_2O/Na_2O$ ratio is 1.5 to 7.5.

Further, $Na_2O$ accounts for 4 to 8%, preferably more than 5% but less than or equal to 8%; and/or $Al_2O_3$ accounts for 7 to 15%; and/or $ZrO_2$ accounts for 1 to 2%; and/or $P_2O_5$ accounts for 1 to 2%; and/or $K_2O$ accounts for 1 to 3%; and/or CaO accounts for 0 to 1%; and/or BaO accounts for 0 to 1%; and/or $SnO_2$ accounts for 0.05 to 0.2%; and/or the clarificant accounts for 0 to 1%; and/or $SiO_2/Li_2O$ ratio is 5 to 9; and/or $ZrO_2/Li_2O$ ratio is more than 0 but less than or equal to 0.30; and/or $Al_2O_3/(Na_2O+Li_2O)$ ratio is 1 to 1.5; and/or $Li_2O/Na_2O$ ratio is 2 to 7, preferably $Li_2O/Na_2O$ ratio is 2 to 6.

Further, $TiO_2$ accounts for 0.5 to 5%, preferably $TiO_2$ accounts for 1.5 to 4%; and/or $ZrO_2+P_2O_5+TiO_2$ account for 0.5 to 10%, preferably $ZrO_2+P_2O_5+TiO_2$ account for 1 to 8%, and more preferably $ZrO_2+P_2O_5+TiO_2$ account for 2 to 6%.

Further, $TiO_2$ accounts for 2 to 9.5%, preferably $TiO_2$ accounts for 5 to 8.5%; and/or $ZrO_2+P_2O_5+TiO_2$ account for 1 to 16%, preferably $ZrO_2+P_2O_5+TiO_2$ account for 2 to 12%.

Further, the glass ceramic also contains $NiO$ and/or $Ni_2O_3$ with total amount thereof not more than 6%, preferably not more than 4%, more preferably not more than 3%, and a lower limit of the total amount thereof more than 0.1%; or the glass ceramic contains $Pr_2O_5$ with content not more than 8%, preferably not more than 6%, more preferably not more than 5%, and a lower limit of the content thereof more than 0.4%; or the glass ceramic contains $CoO$ and/or $Co_2O_3$ with total amount thereof not more than 2%, preferably not more than 1.8%, and a lower limit of the total amount thereof more than 0.05%; or the glass ceramic contains $Cu_2O$ and/or $CeO_2$ with total amount thereof not more than 4%, preferably not more than 3%, and a lower limit of the total amount thereof more than 0.5%; or the glass ceramic contains $Fe_2O_3$ with content not more than 8%, preferably not more than 5%, and more preferably not more than 3%; or the glass ceramic contains $Fe_2O_3$ and $CoO$ with $CoO$ not more than 0.3%; or the glass ceramic contains $Fe_2O_3$ and $Co_2O_3$ with $Co_2O_3$ not more than 0.3%; or the glass ceramic contains $Fe_2O_3$, $CoO$ and $NiO$; or the glass ceramic contains $Fe_2O_3$, $Co_2O_3$ and $NiO$; or the glass ceramic contains $Fe_2O_3$, $CoO$ and $Co_2O_3$ with a lower limit of the total amount of $CoO$ and $Co_2O_3$ more than 0.2%; or the glass ceramic contains $Fe_2O_3$, $CoO$, $NiO$ and $Co_2O_3$; or the glass ceramic contains $MnO_2$ with content not more than 4%, preferably not more than 3%, and a lower limit of the content thereof more than 0.1%; or the glass ceramic contains $Er_2O_3$ with content not more than 8%, preferably not more than 6%, and a lower limit of the content thereof more than 0.4%; or the glass ceramic contains $Nd_2O_3$ with content not more than 8%, preferably not more than 6%, and a lower limit of the content thereof more than 0.4%; or the glass ceramic contains $Er_2O_3$, $Nd_2O_3$ and $MnO_2$ with $Er_2O_3$ content within 6%, $Nd_2O_3$ content within 4%, and $MnO_2$ content within 2%, and a lower limit of the total amount thereof more than 0.9%; or the glass ceramic contains $Cr_2O_3$ with content not more than 4%, preferably not more than 3%, more preferably not more than 2%, and a lower limit of the content thereof more than 0.2%; or the glass ceramic contains $V_2O_5$ with content not more than 4%, preferably not more than 3%, more preferably not more than 2%, and a lower limit of the content thereof more than 0.2%.

Further, the $Li_2Si_2O_5$ crystalline phase accounts for 20 to 40% of the glass ceramic by wt %, preferably 20 to 35%, more preferably 20 to 30%, and still more preferably 20 to 25%.

Further, the quartz and the quartz solid solution crystalline phase account for 15 to 30% of the glass ceramic by wt %, preferably 20 to 30%, more preferably 25 to 30%.

Further, the $Li_2Si_2O_5$ crystalline phase, the quartz and the quartz solid solution are main crystalline phases, and the total content thereof accounts for less than 50% of the glass ceramic by wt %, preferably 48% or less, and more preferably 46% or less.

Further, $LiAlSi_4O_{10}$ crystalline phase accounts for not more than 15% of the glass ceramic by wt %.

Further, an upper limit of liquidus temperature is 1450° C., preferably 1400° C., more preferably 1380° C., and most preferably 1320° C.

Further, thermal conductivity of the glass is above 2 W/m·k at room temperature (25° C.).

A glass ceramic substrate made of the glass ceramic by chemical tempering.

Further, Vickers hardness (Hv) is above 600 kgf/mm$^2$, preferably above 650 kgf/mm$^2$, and more preferably above 700 kgf/mm$^2$.

Further, the glass ceramic substrate does not break when a 32 g steel ball fall to the substrate from a height of 500 mm, and the height is preferably above 650 mm, and more preferably above 800 mm.

Further, three-point bending strength is above 450 Mpa, preferably above 600 Mpa, and more preferably above 800 Mpa.

Further, a compressive stress layer is formed by ion exchange treatment, and compressive stress value of the compressive stress layer is above 300 Mpa, preferably above 400 Mpa, and more preferably above 500 Mpa.

Further, thickness of the compressive stress layer is above 1 μm, preferably above 5 μm, and more preferably above 8 μm.

A portable electronic device containing the glass ceramic.

The portable electronic device, containing the glass ceramic substrate.

The present invention has the following beneficial effects: the thermal conductivity of the glass ceramic of the invention is above 2 w/m·k at room temperature, and the tempered Vickers hardness (Hv) is above 600 kgf/mm$^2$. The glass ceramic or substrate of the invention is applicable to protective components of portable electronic devices, optical devices and the like, especially suitable for being as back cover due to high thermal conductivity and strength, good transparency or individualized colors. The glass ceramic of the invention can also be used as a heat conducting material due to high thermal conductivity, and can also be used for other decorative purposes such as for outer frame members of portable electronic devices having unique appearance made of glass materials.

DETAILED DESCRIPTION

The glass ceramic of the invention is a material having both crystalline phase and glass phase and different from amorphous solid. The crystalline phase of the glass ceramic can be identified by the peak angle in the X-ray diffraction pattern from X-ray diffraction analysis and TEMEDX. In the glass ceramic of the invention, a crystalline phase contains at least one of $R_2SiO_3$, $R_2Si_2O_5$, $R_2TiO_3$, $R_4Ti_5O_{12}$, $R_3PO_3$, $RAlSi_2O_6$, $RAlSiO_4O_{10}$, $R_2Al_2Si_2O_8$, $R_4Al_4Si_5O_{18}$, quartz and quartz solid solution, and R is at least one selected from Li, Na and K.

Among them, the $Li_2Si_2O_5$ crystalline phase is a lithium disilicate crystalline phase which is an orthorhombic crystal based on $[Si_2O_5]$ tetrahedral array, and the crystal is flat or platy. In the interior of the glass ceramic, the lithium disilicate crystalline phase is an irregular and non-oriented interlocking microstructure, which forces crack to bend path when passing through the crystal, thus preventing the crack from propagation and improving strength and toughness of the glass ceramic. Compared with the glass phase, the lithium disilicate crystalline phase has higher thermal conductivity, thus improving the thermal conductivity of the glass ceramic. In the glass ceramic of the invention, the $Li_2Si_2O_5$ crystalline phase accounts for 20 to 40% of the glass ceramic by wt %, preferably 20 to 35%, more preferably 20 to 30%, and still more preferably 20 to 25%.

The quartz and the quartz solid solution crystalline phase belong to trigonal or hexagonal crystal systems, and exist in the form of spheres in the glass ceramic, which can further prevent propagation of microcracks and improve bending strength and toughness of the glass ceramic. Compared with the glass phase, the quartz and the quartz solid solution crystalline phase have higher thermal conductivity, thus improving the thermal conductivity of the glass ceramic. The quartz and the quartz solid solution crystalline phase account for 15 to 30% of the glass ceramic by wt %, preferably 20 to 30%, and more preferably 25 to 30%.

By controlling crystallization process and component content, the glass ceramic uses the $Li_2Si_2O_5$ crystalline phase, the quartz and the quartz solid solution as main crystalline phases, and total content thereof accounts for less than 50% of the glass ceramic by wt %. Research shows that if the content of the main crystalline phases exceeds 50%, the crystalline phase content is relatively high for glass, resulting in poor tempering effect of the glass ceramic, which is unable to increase strength of the glass, but conversely reduces strength of the glass. The total content of the $Li_2Si_2O_5$ crystalline phase, the quartz and the quartz solid solution is preferably kept below 48%, more preferably below 46%.

Petalite $LiAlSi_4O_{10}$ is a monoclinic crystal, a three-dimensional frame structure with a laminated structure made of folded $Si_2O_6$ layers due to connection by Li and Al tetrahedrons, has a low expansion coefficient, can be used to improve thermal shock resistance of the glass ceramic, acts as an auxiliary crystalline phase of the glass ceramic, and accounts for not more than 15% of the glass ceramic by wt %.

The inventors of the invention have, through repeated tests and studies, obtained the glass ceramic or the glass ceramic substrate of the invention at a low cost by prescribing the content and content ratio of specific components constituting the glass ceramic to specific values and separating out specific crystalline phases. The composition of each components of the glass ceramic of the invention is described below. In the Description, unless otherwise specified, the content of each component is represented by wt % relative to the total amount of glass substances converted into the composition of oxides. Here, "converted into the composition of oxides" refers to that oxides, composite salts and metal fluorides, used as raw materials for the components of the glass ceramic of the present invention, are fully decomposed and converted into the oxide at fusion, and the total amount of the substances of the oxide is 100%. Besides, when the glass is only called in the Description, bare glass before crystallization is included sometimes.

$SiO_2$ is a necessary component for the formation of a reticular glass structure of the glass ceramic of the present invention and the component of a crystalline phase through thermal treatment of the bare glass. If the amount thereof is lower than 60%, chemical durability and devitrification resistance of the obtained glass are poor. Hence, the lower limit of $SiO_2$ content is preferably 60%, more preferably 65%, and further preferably 68%. On the other hand, the excessive viscosity rise and the meltability decrease can be constrained by making the $SiO_2$ content below 80%. Hence, the upper limit of $SiO_2$ content is preferably 80%, more preferably 78%, and further preferably 75%.

$Al_2O_3$ and $SiO_2$ are both the components for the formation of the reticular glass structure, are important components conducive to stabilizing the bare glass and improving chemical durability, and are also capable of improving the thermal conductivity of the glass. But, the effect is poor if the content thereof is lower than 4%. Hence, the lower limit of $Al_2O_3$ content is 4%, preferably 5%, more preferably 6%, and further preferably 7%. On the other hand, if the $Al_2O_3$ content is more than 20%, the meltability and the devitrification resistance reduce. Hence, the upper limit of $Al_2O_3$ content is 20%, preferably 18%, and more preferably 15%.

$Li_2O$ is an optional component to improve the low-temperature meltability and formability of the glass, and can become the necessary component for constituting the required crystalline phase through the thermal treatment of the bare glass. If the content thereof is lower than 6%, the effect is poor. On the other hand, excessive $Li_2O$ can easily lead to decrease of chemical durability or increase in average linear expansion coefficient. Hence, the upper limit of $Li_2O$ content is preferably 15%, more preferably 12%, and further preferably 10%. If the glass ceramic contains $Li_2O$, it is very effective to form a deep compressive stress layer when chemical tempering is conducted by ion exchange.

$Na_2O$ is an optional component to improve low-temperature meltability and formability, but excessive $Na_2O$ can easily lead to decrease of the chemical durability or increase in the average linear expansion coefficient. Hence, the upper limit of $Na_2O$ content is preferably 12%, more preferably 10%, and most preferably 8%. If the glass ceramic contains $Na_2O$, it is very effective to form the compressive stress layer by the exchange of $Na^+$ and $K^+$ ions in the glass ceramic when chemical tempering is conducted by ion exchange. Hence, the lower limit of $Na_2O$ content is more than 0, preferably 0.5%, further preferably 2%, more preferably 4%, and most preferably more than 5% when chemical tempering is conducted by ion exchange.

$P_2O_5$ can be subject to phase splitting to form a crystal nucleus in the glass, and is an optional component which is conducive to improving the low-temperature meltability of the glass. The lower limit of $P_2O_5$ content is preferably more than 0, more preferably 0.4%, further preferably 0.8%, and most preferably 1%. But excessive $P_2O_5$ can easily lead to decrease of the devitrification resistance and phase splitting of the glass. Hence, the upper limit of $P_2O_5$ content is preferably 5%, more preferably 3%, and most preferably 2%.

$ZrO_2$ plays a role in separating from a crystal to form the crystal nucleus, and is an optional component to improve the chemical durability of the glass. The lower limit of $ZrO_2$ content is preferably more than 0, more preferably 0.4%, further preferably 0.8%, and most preferably 1%. But excessive $ZrO_2$ can easily lead to decrease of the devitrification resistance of the glass. Hence, the upper limit of $ZrO_2$ content is preferably 5%, more preferably 3%, and most preferably 2%.

$TiO_2$ is an optional component which is conducive to lowering a melting temperature of the glass ceramic and improving the chemical durability.

In some embodiments, the lower limit of $TiO_2$ content is preferably more than 0, more preferably 0.5%, further preferably 1%, and most preferably 1.5%. On the other hand, the melting temperature of the glass ceramic can be lowered by making the $TiO_2$ content below 6%. Hence, the upper limit of $TiO_2$ content is preferably 6%, more preferably 5%, and most preferably 4%.

In such a condition, the total content of $ZrO_2$, $P_2O_5$ and $TiO_2$ can be controlled to separate out homogeneous crystals, namely, $ZrO_2+P_2O_5+TiO_2$ accounts for 0.5 to 10%. In order to obtain the effect easier, the lower limit of $ZrO_2+P_2O_5+TiO_2$ is preferably 0.5%, more preferably 1%, further preferably 2%; and the upper limit of $ZrO_2+P_2O_5+TiO_2$ is preferably 10%, more preferably 8%, and further preferably 6%.

In some embodiments, the glass is devitrified easily due to high total content of $Li_2O$ and $Na_2O$ in the glass, and free oxygen of the glass can be absorbed to form a network forming body after $TiO_2$ is added, thereby lowering the liquidus temperature of the glass. The lower limit of $TiO_2$ content is preferably more than 0, more preferably 2%, further preferably 3%, still further preferably 5%, and most preferably more than 6%. On the other hand, excessive $TiO_2$ cannot enter the glass network, resulting in glass devitrification. Hence, the upper limit of $TiO_2$ content is 10%, preferably 9.5%, more preferably 9%, and most preferably 8.5%.

In such a condition, the total content of $ZrO_2$, $P_2O_5$ and $TiO_2$ is controlled to separate out homogeneous crystals, namely, $ZrO_2+P_2O_5+TiO_2$ accounts for 1 to 16%. In order to obtain the effect easier, the lower limit of $ZrO_2+P_2O_5+TiO_2$ is preferably 1%, most preferably 2%; and the upper limit of $ZrO_2+P_2O_5+TiO_2$ is preferably 16%, more preferably 12%.

In the present invention, to obtain the desired crystalline phase to improve the thermal conductivity and hardness of the glass ceramic substrate, the ratio of the $SiO_2$ content to the $Li_2O$ content is required to be controlled, namely, the $SiO_2/Li_2O$ ratio is 4 to 10. In order to obtain the effect easier, the lower limit of the $SiO_2/Li_2O$ ratio is preferably 4, more preferably 4.5, and most preferably 5; and the upper limit of the $SiO_2/Li_2O$ ratio is preferably 10, more preferably 9.5, and most preferably 9.

In the present invention, in an attempt to obtain more homogeneous fine crystalline phases in the glass to improve the thermal conductivity and bending strength of the glass ceramic substrate, it is a necessary to control the ratio of the $ZrO_2$ content to the $Li_2O$ content, that is, $ZrO_2/Li_2O$ ratio is 0 to 0.5, preferably more than 0 but less than 0.35, more preferably more than 0 but less than or equal to 0.30.

In the present invention, in an attempt to obtain the better tempering effect to improve the strength of the glass ceramic substrate, it is necessary to control the ratio of the content of $Al_2O_3$ content to the total content of $LiO_2$ and Na2O, that is, the lower limit of the $Al_2O_3/(Na_2O+Li_2O)$ ratio is preferably 0.5, more preferably 0.7, and most preferably 1; and the upper limit of $Al_2O_3/(Na_2O+Li_2O)$ ratio is preferably 2, more preferably 1.8, and most preferably 1.5.

In the present invention, for realizing the better devitrification resistance, meltability and formability in melting, it is necessary to control the ratio of $Li_2O$ to $Na_2O$, namely, the $Li_2O/Na_2O$ ratio is 0.8 to 8 preferably. In order to obtain the effect easier, the lower limit of the $Li_2O/Na_2O$ ratio is preferably 0.8, more preferably 1.5, and most preferably 2; and the upper limit of the $Li_2O/Na_2O$ ratio is preferably 8, more preferably 7.5, further preferably 7, and most preferably 6.

$B_2O_3$ contributes to the decrease of the glass viscosity, the improvement of the glass meltability, formality and toughness, and thus can be added as the optional component. Excessive $B_2O_3$ can easily lead to decrease of the chemical durability of the glass ceramic, and easily restrain separation of the desired crystals. Hence, the upper limit of $B_2O_3$ content is preferably 5%, more preferably 4%, and most preferably lower than 2%.

$K_2O$ is an optional component which helps to improve the low-temperature meltability and formality of the glass. But excessive $K_2O$ can easily lead to decrease of the chemical durability and increase of the average linear expansion coefficient. Hence, the upper limit of $K_2O$ content is preferably 5%, more preferably 4%, and most preferably 3%. If the glass ceramic contains $K_2O$, it is very effective to form the deep compressive stress layer when chemical tempering is conducted by ion exchange. Hence, the lower limit of $K_2O$ content is more than 0, more preferably 0.5%, further preferably 0.8%, and most preferably 1% when chemical tempering is conducted by ion exchange.

MgO is an optional component which facilitates the decrease of the glass viscosity, restrains the devitrification of the bare glass when it is formed, and improves the low-temperature meltability. The lower limit of the MgO content is preferably more than 0. However, if the MgO content is high, the decrease of the devitrification resistance may be caused, and the non-ideal crystals may be obtained to result in the performance decline of the glass ceramic after crystallization. Hence, the upper limit of MgO content is preferably 2%.

ZnO is an optional component which can improve the meltability and chemical stability of the glass, and the lower limit of ZnO content is preferably more than 0; and on the other hand, the upper limit of ZnO content can be controlled to be below 2% to restrain decrease in the devitrification resistance.

CaO is an optional component which helps to the improvement of the glass low-temperature meltability. But excessive CaO can easily lead to decrease of the devitrification resistance. Hence, the upper limit of CaO content is preferably 5%, more preferably 4%, further preferably 3%, and most preferably 1%.

BaO is an optional component which facilitates the improvement of the glass low-temperature meltability. But excessive BaO can easily lead to decrease of the devitrification resistance. Hence, the upper limit of BaO content is preferably 5%, more preferably 4%, further preferably 3%, and most preferably 1%.

FeO can be used as a clarificant, and thus can be contained randomly. But excessive FeO can easily lead to excessive coloring or alloying of platinum for a glass melting plant. Hence, the upper limit of the FeO content is preferably 3%, more preferably 1%.

$SnO_2$ is an optional component that can be used as a clarificant and can separate out crystals to form a crystal nucleus. Hence, the lower limit of $SnO_2$ content is preferably more than 0, more preferably 0.01%, and most preferably 0.05%. But excessive $SnO_2$ can easily lead to decrease of the devitrification resistance of the glass. Hence, the upper limit of $SnO_2$ content is preferably 2%, more preferably 1%, further preferably 0.4%, and most preferably 0.2%.

SrO is an optional component which helps to improve the glass low-temperature meltability. But excessive SrO can easily lead to decrease of the devitrification resistance. Hence, the upper limit of SrO content is preferably 5%, more preferably 3%, and most preferably 1%.

$La_2O_3$ is an optional component capable of improving the hardness of the glass ceramic, so that a small amount thereof can be added to lower the glass melting temperature and reduce the liquidus temperature to a certain degree. But excessive $La_2O_3$ can easily lead to decrease of the devitrification resistance. Hence, the $La_2O_3$ content is below 10%, preferably below 9%, more preferably more than 0 but less than or equal to 8%.

$Y_2O_3$ is an optional component of capable of improving the hardness, chemical stability and thermal conductivity of the glass ceramic, so that a small amount thereof can be added to lower the glass melting temperature and reduce the liquidus temperature to a certain degree. But excessive $Y_2O_3$ can easily lead to decrease of the devitrification resistance. Hence, the $Y_2O_3$ content is below 10%, preferably below 9%, more preferably more than 0 but less than or equal to 8%.

$Nb_2O_5$ is an optional component capable of improving the mechanical strength of the glass ceramic. But excessive $Nb_2O_5$ can easily lead to decrease of the devitrification resistance. Hence, the upper limit of $Nb_2O_5$ content is preferably 10%, more preferably 8%, and most preferably 5%.

$Ta_2O_5$ is an optional component capable of improving the mechanical strength of the glass. But excessive $Ta_2O_5$ can easily lead to decrease of the devitrification resistance. Hence, the upper limit of $Ta_2O_5$ content is preferably 10%, more preferably 8%, and most preferably 5%.

$WO_3$ is an optional component capable of improving the mechanical strength of the glass. But excessive $WO_3$ can easily lead to decrease of the devitrification resistance. Hence, the upper limit of $WO_3$ content is preferably 5%, more preferably 2%, and most preferably 1%.

In the glass ceramic of the present invention, the clarificant can also contain $As_2O_3$, $Sb_2O_3$, $CeO_2$ and one or more than two selected from a group of F, Cl, NOx and SOx. However, the upper limit of the clarificant content is preferably 5%, more preferably 2%, and most preferably 1%.

The glass ceramics of different colors can be prepared by adding a certain amount of colorant into the glass ceramic of the present invention.

When brown or green glass ceramic is prepared by using NiO and/or $Ni_2O_3$ as a colorant, the two components can be used separately or together, and contents thereof are respectively not more than 6%, preferably not more than 4%, and more preferably not more than 3%. The lower limits of contents thereof are more than 0.1% respectively. If NiO and $Ni_2O_3$ are used together, the total amount thereof is generally not more than 6%; if the content is more than 6%, the colorant cannot be dissolved into the glass well.

When $Pr_2O_5$ is used as a green glass composition colorant separately, the content thereof is not more than 8% generally, preferably not more than 6%, more preferably not more than 5%. Due to the fact that the lower limit of content thereof is more than 0.4%, the glass color is not obvious if the content thereof is lower than 0.4%.

When a blue glass ceramic is prepared by using CoO and/or $Co_2O_3$ as a colorant, the two colorant components can be used separately or together, and the contents thereof are generally not more than 2% respectively, preferably not more than 1.8%. If the content of each one is more than 2%, the colorant cannot be dissolved into the glass. If CoO and/or $Co_2O_3$ are used together, the total thereof is not more than 2%. Due to the fact that the lower limit content of each one is more than 0.05%, the glass color is not obvious if the contents thereof are lower than 0.05% respectively.

When a yellow glass ceramic is prepared by using $Cu_2O$ and/or $CeO_2$ as a colorant, the two colorant components are used separately or together. When $Cu_2O$ is used separately, the content thereof is not more than 4%, preferably not more than 3%; and if the content thereof is more than 4%, the glass is devitrified easily. If $CeO_2$ is used separately, the content thereof is not more than 4%, preferably not more than 3%; if the content thereof is more than 4%, the vitreous luster is poor. If the two colorants are used together, the total amount thereof is generally not more than 4%, and the lower limit of content thereof is more than 0.5%.

Black and smoky gray glass ceramics are prepared by using $Fe_2O_3$ separately, or a mixture of $Fe_2O_3$ and CoO, $Fe_2O_3$ and $Co_2O_3$, $Fe_2O_3$, CoO and NiO, $Fe_2O_3$, $Co_2O_3$ and NiO, $Fe_2O_3$, CoO and $Co_2O_3$, or $Fe_2O_3$, CoO, NiO and $Co_2O_3$ as a colorant. If $Fe_2O_3$ is used for coloring separately, the content thereof is not more than 8%, preferably not more than 5%, more preferably not more than 3%. CoO and $Co_2O_3$ can absorb the visible light to deepen the glass blackness. When CoO and $Co_2O_3$ are mixed with $Fe_2O_3$ generally, the contents of CoO and $Co_2O_3$ are not more than 0.3% respectively, and the lower limit of total content thereof is more than 0.2%. NiO can absorb the visible light to deepen the glass blackness, and the content thereof is not more than 1% generally when being used as a mixture.

When a purple glass ceramic is prepared by using $MnO_2$ a colorant, the content thereof is generally not more than 4%, preferably less than 3%. Due to the fact that the lower limit of content thereof is more than 0.1%, the glass color is not obvious if the content thereof is lower than 0.1%.

When a pink glass ceramic is prepared by using $Er_2O_3$ as a colorant, the content thereof is not more than 8%, preferably less than 6%. The glass color cannot be further deepened when the content of a rare earth element $Er_2O_3$ is more than 8% due to its low coloring efficiency, but the glass cost is increased. Due to the fact that the lower limit of content thereof is more than 0.4%, the glass color is not obvious if the content thereof is lower than 0.4%.

A mauve glass composition is prepared by using $Nd_2O_3$ a colorant, the using content thereof is not more than 8%, preferably lower than 6%. The glass color cannot be further deepened when the content of a rare earth element $Nd_2O_3$ is more than 8% due to its low coloring efficiency, but the glass cost is increased. Due to that the lower limit of content thereof is more than 0.4%, the glass color is not obvious if the content thereof is lower than 0.4%.

When a red glass ceramic is prepared by using a mixture of $Er_2O_3$, $Nd_2O_3$ and $MnO_2$ as a colorant, Er ions are absorbed at 400-500 nm in the glass, Mn ions are mainly absorbed at 500 nm, Nd ions are mainly absorbed at 580 nm strongly. A red glass composition can be prepared by a mixture of the three. When $Er_2O_3$ and $Nd_2O_3$ color the rare earth, the coloring power is rather weak because the usage amounts of $Er_2O_3$ and $Nd_2O_3$ are lower than 6% and lower than 4% respectively; the Mn ions are strong in coloring power; the usage amount of $MnO_2$ is lower than 2%; and the lower limit of total amount of the mixed colorant is more than 0.9%.

When $Cr_2O_3$ is used as a green glass composition colorant separately, the content thereof is not more than 4% generally, preferably not more than 3%, more preferably not more than 2%. Due to the fact that the lower limit of content is more than 0.2%, the glass color is not obvious if the content thereof is lower than 0.2%.

When $V_2O_5$ is used as a yellow green glass composition colorant separately, the content thereof is not more than 4% generally, preferably not more than 3%, more preferably not more than 2%. Due to the fact that the lower limit of the content is more than 0.2%, the glass color is not obvious if the content thereof is lower than 0.2%.

The glass ceramic of the present invention can be composed of the above components only, but can be added with other components in a range in which the glass property are not damaged seriously. For instance, $TeO_2$, $Bi_2O_3$ and $GeO_2$ can be added.

The glass ceramic of the present invention has the following features.

The glass ceramic of the present invention is high in devitrification resistance, more particularly, low in liquidus temperature. That is, the upper limit of the liquidus temperature of the glass of the present invention is preferably 1,450° C., more preferably 1,400° C., further preferably 1,380° C., and most preferably 1,320° C. Therefore, even if the molten glass flows out at the low temperature, the devitrification can decrease when the glass is formed from a molten state. Besides, the glass can be formed even if the melting temperature of the glass decreases. Therefore, the degradation of a platinum device and a module can be restrained, energy consumed can be decreased when the glass is formed, and the glass production cost can be lowered.

On the other hand, there is no special limit on the lower limit of the liquidus temperature of the glass of the present invention. The lower limit of liquidus temperature of the glass prepared by the present invention is preferably 1,000° C., more preferably 1,100° C., and most preferably 1,200° C.

The above liquidus temperature is a devitrification resistance indicator. In the Description, the value determined by the following method is used as the liquidus temperature. Firstly, a 30 cc chip glass sample is placed into a 50 ml platinum crucible, and is kept in a completely molten state at 1,500° C. Secondly, the glass is taken out of the furnace for cooling after cooled to a specified temperature and kept for 12 h; crystals are respectively observed on a glass surface and the glass once every 10° C. until 1,200° C., wherein the lowest temperature at which no crystals are found is taken as the liquidus temperature within the specified temperature.

The thermal conductivity of the glass ceramic of the present invention is above 2 W/m·k.

The glass ceramic substrate of the present invention can be subject to ion exchange to form the compressive stress layer for implementing chemical tempering. The compressive stress value thereof is preferably above 300 Mpa when the compressive stress layer is formed. Due to such compressive stress value, the crack extension can be restrained and the mechanical strength can be improved. Hence, when chemical tempering is conducted, the compressive stress layer of the glass ceramic substrate of the present invention has the compressive stress value preferably above 300 Mpa, more preferably above 400 Mpa, and most preferably above 500 Mpa.

The compressive stress layer of the glass ceramic substrate of the present invention has a thickness preferably above 1 μm. Even if deep cracks are generated on the glass ceramic substrate, crack extension or substrate breakage can be restrained due to the fact that the compressive stress layer has such thickness. Hence, the compressive stress layer has the thickness preferably above 1 μm, more preferably above 5 μm, and most preferably above 8 μm.

The glass ceramic substrate of the present invention has a Vickers hardness (Hv) preferably above 600. Due to such hardness, the scratches can be restrained and the mechanical strength can be improved. The glass ceramic of the present invention has the Vickers hardness (Hv) preferably above 600, more preferably above 650, and most preferably above 700.

The glass ceramic substrate of the present invention cannot break preferably even if a 32 g steel ball falls to the substrate from a height of 500 mm. With such impact resistance, it can bear the impact caused by falling down or collision when being used as a protection component.

Hence, the glass ceramic substrate does not break when the 32 g steel ball falls down preferably from a height above 500 mm, more preferably above 650 mm, and most preferably above 800 mm.

A three-point bending strength of the glass ceramic substrate of the present invention is preferably 450 Mpa. Due to such three-point bending strength, the glass will not be broken while bearing the sufficient pressure. Hence, the three-point bending strength is preferably above 450 Mpa, more preferably above 600 Mpa, and most preferably above 800 Mpa.

The glass ceramic of the present invention can be prepared by the following methods: homogeneously mixing raw materials by component proportion ranges; placing the homogeneous mixture into a platinum or quartz crucible; melting in an electric furnace or a gas furnace for 5 to 24 h in a temperature range from 1,250° C. to 1,550° C. based on the melting difficulty of the glass composition; after stirring homogeneously, cooling to a proper temperature and casting to a mold, and finally cooling.

The bare glass of the glass ceramic of the present invention can be formed by virtue of a well-known method.

The bare glass of the glass ceramic of the present invention is crystallized after formed or processed, and the crystals are separated inside the glass homogeneously. The crystallization treatment can be conducted through one stage or two stages, but two stages are preferred. A nucleus formation technology is conducted at a first temperature, and a crystal growth technology is conducted at a second temperature higher than that of the nucleus formation technology. The crystallization treatment conducted at the first temperature is called the first crystallization treatment, and the crystallization treatment conducted at the second temperature is called the second crystallization treatment.

For making the glass ceramic have the desired physical properties, the preferred thermal treatment condition is as follows:

The nucleus formation and crystal growth technologies can be conducted continuously by virtue of the crystallization treatment at one stage. That is, the glass ceramic is kept at the thermal treatment temperature for a certain period of time after rise to the specified crystallization treatment temperature, and then cooled. The crystallization treatment temperature is preferably 500 to 700° C., more preferably 550 to 680° C. in an order to separate the desired crystalline phase. The holding time is preferably 0 to 8 h, more preferably 1 to 6 h at the crystallization treatment temperature.

When the crystallization treatment is conducted through the above two stages, the first temperature is preferably 500 to 700° C., and the second temperature is preferably 650 to 850° C. The holding temperature is preferably 0 to 24 h, most preferably 2 to 15 h at the first temperature. The holding temperature is preferably 0 to 10 h, most preferably 2 to 5 h at the second temperature.

The above holding time as 0 min refers to that cooling or heating is started after the temperature thereof is reached for less than 1 min.

The bare glass or the glass ceramic of the present invention can be made into the glass forming body with the aid of a grinding or polishing method. The glass ceramic substrate can be prepared by taking the glass ceramic of the present invention as a substrate by means of processing the glass forming body to be a sheet shape. However, the method for making the glass forming body is not limited to these methods.

The glass ceramic substrate of the present invention can be prepared into various shapes at a certain temperature by a hot bending or pressing method, and the hot bending and pressing temperatures are lower than the crystallization temperature. However, the method for making the glass in various shapes is not limited to these methods.

For the glass ceramic of the present invention, high strength can be obtained by the formation of the compressive stress layer, in addition to separating the crystals to improve the mechanical property. The method for forming the compressive stress layer includes a chemical tempering method, that is, the compressive stress layer is formed on the surface layer by the exchange reaction between alkaline components on the surface layer of the glass ceramic substrate and alkaline components with the radius more than the former. Besides, there is an ion implantation method capable of injecting ions into the surface layer of the glass ceramic substrate and a hot tempering method capable of heating the glass ceramic substrate, and then rapidly cooling the same.

The glass ceramic and the glass ceramic substrate of the present invention are applicable to making protective cover plates for such portable electronic devices as mobile phones, tablet PCs and watches, thereby being applicable to mobile phones, tablet PCs and other portable electronic devices. Meanwhile, the glass ceramic and the glass ceramic substrate of the present invention are also applicable to various optical instruments.

The embodiments (Tables 1 to 8) of the present invention are prepared by the following methods: firstly, selecting the respective corresponding oxides, hydroxides, carbonates, nitrates, fluorides, chlorides, hydroxides and metaphosphoric acid compounds as various component components; homogeneously mixing raw materials by component proportion ranges; placing the homogeneous mixture into a platinum or quartz crucible; melting in an electric furnace or a gas furnace for 5 to 24 h in a temperature range from 1,250° C. to 1,550° C. based on the melting difficulty of the glass composition; after stirring homogeneously, cooling to a proper temperature and casting to a mold, and finally cooling to obtain the bare glass slowly.

With respect to the obtained bare glass, the glass ceramic is made for nucleus formation and crystallization by the thermal treatment at the first stage or the second stage respectively. Embodiments 15, 18, 20 and 22 are subject to thermal treatment at the first stage, and other embodiments are subject to thermal treatment at the second stage. In Tables 1 to 8, the thermal treatment conditions at the first stage are recorded in the column "nucleus formation technology", the thermal treatment conditions at the second stage are recorded in the column "crystallization technology", and the thermal treatment temperatures and the holding time at the temperatures thereof are shown in the tables.

For the crystalline phase of the glass ceramic before chemical tempering in the embodiments, the crystalline phase of the glass ceramic substrate is analyzed by an X-ray diffraction analysis apparatus with the help of an angle of displaying a peak value on an X-ray diffraction pattern.

The prepared glass ceramic is cut and ground to obtain 36×29×0.7 mm sheets; opposed faces are polished in parallel; and then the polished glass ceramic is soaked into $KNO_3$ molten salt for chemical tempering to obtain the glass ceramic substrate. The temperature and time for soaking the molten salt are shown in the column "chemical tempering conditions" in the table.

A compressive stress value of the surface of the glass ceramic substrate chemically tempered and the thickness of the compressive stress layer are determined by a glass surface stress gauge FSM-6000. The determination condition is that calculation is conducted based on a refractive index of the sample as 1.53 and an elastic constant of 28.5 [(nm/cm)/Mpa].

The Vickers hardness of the glass ceramic substrate in the embodiments is expressed by a load (N) of a diamond square pyramid pressure head divided by a surface area ($mm^2$) calculated by an indentation length. The head with an 136° angle between the opposed surfaces is pressed into a pyramid shape on a test surface. The calculation is conducted when a test load is 100 (N) and the holding time is 15 s. With regard to the embodiments having "the chemical tempering conditions", the calculation is conducted for the chemically tempered substrate.

The ball falling height in the embodiments indicates the maximum ball falling height capable of bearing the impact under the condition that the substrate does not break when two surfaces of the 36×29×0.8 mm substrate are polished and then placed on a rubber sheet to make the 32 g steel ball fall from the specified height. To be specific, the test is conducted when the ball falling height is 650 mm. The height is changed as 700 mm, 750 mm, 800 mm, 850 mm or 900 mm without breaking. With regard to the embodiments having "the chemical tempering conditions", the substrate chemically tempered is used as a test object. The test data recorded as 900 mm in the embodiments indicates that the substrate bears the impact without breaking even if the steel ball falls down to the substrate from a height of 900 m.

The three-point bending strength of the 36×29×0.7 mm glass in Tables 1 to 8 is tested by a microcomputer controlled electronic universal testing machine CMT6502 based on standard ASTM C 158-2002.

The thermal conductivity of the glass ceramic in Tables 1 to 8 is determined by a thermal conductivity test instrument LFA447. Based on such determination conditions as room temperature of 25° C. and sample specification of Φ12.7 mm×1.5 mm, *Glass. The Method for Measuring Thermal Conductivity* (JC/T675-1997) is conducted.

The color in the embodiments is the color of a glass sheet 36×29×0.8 mm visually observed.

TABLE 1

| Component | Embodiments | | | | | | | | | |
|---|---|---|---|---|---|---|---|---|---|---|
| (wt %) | 1 | 2 | 3 | 4 | 5 | 6 | 7 | 8 | 9 | 10 |
| $SiO_2$ | 60 | 61 | 62 | 63 | 64 | 65 | 66 | 67 | 68 | 69 |
| $Al_2O_3$ | 20 | 15 | 16 | 17 | 18 | 19 | 14 | 13 | 13 | 12 |
| $Li_2O$ | 8 | 9 | 8 | 11 | 12 | 10 | 14 | 15 | 13 | 12 |
| $Na_2O$ | 5 | 3 | 3 | 5 | 3 | 2 | 2 | 4 | 3 | 6 |
| $P_2O_5$ | 2 | 2 | 2 | 3 | 2 | 1 | | | 1 | |
| $ZrO_2$ | 3 | 2 | 2 | 1 | 1 | 1 | 1 | 1 | 1 | 1 |
| $TiO_2$ | 2 | | 2 | | | 2 | 1 | | 1 | |
| $B_2O_3$ | | 2 | 1 | | | | | | | |

TABLE 1-continued

| Component | Embodiments | | | | | | | | | |
|---|---|---|---|---|---|---|---|---|---|---|
| (wt %) | 1 | 2 | 3 | 4 | 5 | 6 | 7 | 8 | 9 | 10 |
| $K_2O$ | | 3 | 1.5 | | | | | | | |
| MgO | | 1 | 0.5 | | | | 1 | | | |
| ZnO | | 2 | 2 | | | | 1 | | | |
| Total | 100 | 100 | 100 | 100 | 100 | 100 | 100 | 100 | 100 | 100 |
| $SiO_2/Li_2O$ | 7.5 | 6.8 | 7.8 | 5.7 | 5.3 | 6.5 | 4.7 | 4.5 | 5.2 | 5.8 |
| $Al_2O_3/(Na_2O + Li_2O)$ | 1.5 | 1.3 | 1.5 | 1.1 | 1.2 | 1.6 | 0.9 | 0.7 | 0.8 | 0.7 |
| $Li_2O/Na_2O$ | 1.6 | 3 | 2.7 | 2.2 | 4 | 5 | 7 | 3.8 | 4.3 | 2 |
| $ZrO_2 + P_2O_5 + TiO_2$ | 7 | 4 | 6 | 4 | 3 | 4 | 2 | 1 | 3 | 1 |
| $ZrO_2/Li_2O$ | 0.38 | 0.22 | 0.25 | 0.09 | 0.08 | 0.10 | 0.07 | 0.07 | 0.08 | 0.38 |
| Liquidus temperature (° C.) | 1230° C. | 1240° C. | 1220° C. | 1240° C. | 1240° C. | 1240° C. | 1250° C. | 1250° C. | 1250° C. | 1250° C. |
| Nucleus formation technology | 550° C. 24 h | 600° C. 10 h | 600° C. 6 h | 590° C. 10 h | 600° C. 10 h | 600° C. 6 h | 590° C. 10 h | 600° C. 10 h | 600° C. 6 h | 590° C. 10 h |
| Crystallization technology | 690° C. 2 h | 690° C. 6 h | 690° C. 10 h | 710° C. 2 h | 710° C. 3 h | 710° C. 5 h | 730° C. 2 h | 730° C. 3 h | 730° C. 5 h | 750° C. 3 h |
| Crystalline phase | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, $Na_2Si_2O_5$, $LiAlSi_2O_6$, $Li_3PO_3$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$ and quartz and quartz solid solution |
| Chemical tempering conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | 560 | 530 | 520 | — | 535 | 525 | 500 | 520 | 530 | — |
| Stress depth (μm) | 14 | 13 | 12 | — | 13 | 12 | 10 | 12 | 13 | — |
| Vickers hardness (kgf/mm²) | 700 | 702 | 703 | 704 | 712 | 715 | 722 | 725 | 724 | 720 |
| Three-point bending strength (MPa) | 802 | 810 | 830 | 833 | 840 | 842 | 852 | 860 | 862 | 870 |
| Ball falling height (mm) | 750 | 750 | 750 | 850 | 850 | 900 | 900 | 950 | 900 | 850 |
| Thermal conductivity (W/(mK)) | 2.3 | 2.5 | 2.5 | 2.2 | 2.3 | 2.6 | 2.7 | 2.3 | 2.5 | 2.4 |
| Color | Transparent | Transparent | Transparent | Milky | Transparent | Transparent | Transparent | Transparent | Transparent | White |

TABLE 2

| Component | Embodiments | | | | | | | | | |
|---|---|---|---|---|---|---|---|---|---|---|
| (wt %) | 11 | 12 | 13 | 14 | 15 | 16 | 17 | 18 | 19 | 20 |
| $SiO_2$ | 70 | 71 | 72 | 73 | 74 | 75 | 76 | 77 | 78 | 79 |
| $Al_2O_3$ | 12 | 11 | 10 | 7 | 10 | 9 | 9 | 8 | 6 | 6 |
| $Li_2O$ | 10 | 11 | 10 | 11 | 8 | 9.5 | 10.5 | 10 | 13 | 10 |
| $Na_2O$ | 3 | 4 | 7 | 4 | 6 | 2 | 1.5 | 2 | 2 | 4 |
| $P_2O_5$ | 1 | 2 | | 2 | 1 | 1 | | | | |
| $ZrO_2$ | 3 | 1 | 1 | 2 | 1 | 3.5 | 1 | 2 | 1 | 1 |
| $TiO_2$ | 1 | | | 1 | | | 2 | 1 | | |
| $B_2O_3$ | | | | | | | | | | |
| $K_2O$ | | | | | | | | | | |
| MgO | | | | | | | | | | |
| ZnO | | | | | | | | | | |
| Total | 100 | 100 | 100 | 100 | 100 | 100 | 100 | 100 | 100 | 100 |
| $SiO_2/Li_2O$ | 7 | 6.5 | 7.2 | 6.6 | 9.3 | 7.9 | 7.2 | 7.7 | 6 | 7.9 |
| $Al_2O_3/(Na_2O + Li_2O)$ | 0.9 | 0.7 | 0.6 | 0.5 | 0.7 | 0.8 | 0.8 | 0.7 | 0.4 | 0.4 |
| $Li_2O/Na_2O$ | 3.3 | 2.8 | 1.4 | 2.8 | 1.3 | 4.8 | 7 | 5 | 6.5 | 2.5 |
| $ZrO_2 + P_2O_5 + TiO_2$ | 5 | 3 | 1 | 5 | 2 | 4.5 | 3 | 3 | 1 | 1 |

TABLE 2-continued

| Component (wt %) | Embodiments | | | | | | | | | |
|---|---|---|---|---|---|---|---|---|---|---|
| | 11 | 12 | 13 | 14 | 15 | 16 | 17 | 18 | 19 | 20 |
| $ZrO_2/Li_2O$ | 0.30 | 0.09 | 0.10 | 0.18 | 0.13 | 0.37 | 0.10 | 0.20 | 0.08 | 0.10 |
| Liquidus temperature (°C.) | 1250° C. | 1250° C. | 1260° C. | 1270° C. | 1250° C. | 1250° C. | 1250° C. | 1250° C. | 1280° C. | 1280° C. |
| Nucleus formation technology | 600° C. 10 h | 600° C. 6 h | 590° C. 10 h | 600° C. 10 h | 770° C. 4 h | 590° C. 10 h | 600° C. 10 h | 790° C. 5 h | 590° C. 10 h | 810° C. 1 h |
| Crystallization technology | 750° C. 3 h | 750° C. 3 h | 770° C. 4 h | 770° C. 4 h | | 790° C. 5 h | 790° C. 5 h | | 810° C. 1 h | |
| Crystalline phase | $Li_2Si_2O_5$ | $Li_2Si_2O_5$, and quartz solid solution | $Li_2Si_2O_5$, $Na_2Si_2O_5$, and quartz solid solution | $Li_2Si_2O_5$, and quartz solid solution | $Li_2Si_2O_5$, $Na_2Si_2O_5$, and quartz solid solution | $Li_2Si_2O_5$, and quartz solid solution | $Li_2Si_2O_5$, and quartz solid solution | $Li_2Si_2O_5$, $Li_2TiO_3$, and quartz solid solution | $Li_2Si_2O_5$, $Li_2TiO_3$, and quartz solid solution | $Li_2Si_2O_5$, and quartz solid solution | $Li_2Si_2O_5$, and quartz solid solution |
| Chemical tempering conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | — | — | — | — | — | — | — | — | — | — |
| Stress depth (μm) | — | — | — | — | — | — | — | — | — | — |
| Vickers hardness (kgf/mm$^2$) | 724 | 725 | 728 | 730 | 731 | 735 | 736 | 746 | 745 | 745 |
| Three-point bending strength (MPa) | 872 | 876 | 880 | 882 | 886 | 890 | 900 | 901 | 904 | 905 |
| Ball falling height (mm) | 850 | 850 | 800 | 800 | 800 | 750 | 750 | 750 | 750 | 750 |
| Thermal conductivity (W/(mK) | 2.3 | 2.2 | 2.1 | 2.3 | 2.1 | 2.4 | 2.4 | 2.2 | 2.3 | 2.2 |
| Color | Milky white | Milky white | White | Milky white | Milky white | Milky white | Milky white | Milky white | White | White |

TABLE 3

| Component (wt %) | Embodiments | | | | | | | | | |
|---|---|---|---|---|---|---|---|---|---|---|
| | 21 | 22 | 23 | 24 | 25 | 26 | 27 | 28 | 29 | 30 |
| $SiO_2$ | 65 | 65.5 | 67 | 66.5 | 67 | 67.5 | 68 | 68.5 | 69 | 69.5 |
| $Al_2O_3$ | 8 | 8 | 8 | 7 | 7 | 10 | 7 | 6 | 7 | 6 |
| $Li_2O$ | 15 | 9 | 10 | 10 | 10 | 10 | 10 | 10 | 10 | 11 |
| $Na_2O$ | 4 | 8 | 7 | 7 | 7 | 5 | 5 | 5 | 5 | 6 |
| $P_2O_5$ | 1 | | 2 | 1 | | 2 | | | 2 | 1 |
| $ZrO_2$ | 1 | 2 | 1 | 1 | 1 | 2 | 1 | 2 | 2 | 1 |
| $TiO_2$ | | | 2 | 1 | 1 | | | 1 | 1 | |
| $B_2O_3$ | 5 | | | | | 0.5 | | | | |
| $K_2O$ | | 5 | 1 | 0.5 | 1 | 1 | 1 | 0.5 | 2 | |
| MgO | | 1 | 1 | 1 | 1 | 1 | 1 | | 1 | |
| ZnO | | 1 | 1 | | | 1 | | 0.5 | 0.5 | 1 | 0.5 |
| CaO | | | | | | | | | | 5 |
| BaO | | | | | | | | | | |
| FeO | | | | | | | | | | |
| SnO2 | 1 | 0.5 | | | | | | | | |
| SrO | | | | | 5 | | | | | |
| $La_2O_3$ | | | | | | | | | | |
| $Y_2O_3$ | | | | | | | | | | |
| $Nb_2O_5$ | | | | | | | | | 8 | |
| $Ta_2O_5$ | | | | | | | | 7 | | |
| $WO_3$ | | | | | 5 | | | | | |
| Total | 100 | 100 | 100 | 100 | 100 | 100 | 100 | 100 | 100 | 100 |
| $SiO_2/Li_2O$ | 4.3 | 7.3 | 6.7 | 6.7 | 6.7 | 6.8 | 6.8 | 6.9 | 6.9 | 6.3 |
| $Al_2O_3/(Na_2O + Li_2O)$ | 0.4 | 0.5 | 0.5 | 0.4 | 0.4 | 0.7 | 0.5 | 0.4 | 0.5 | 0.4 |
| $Li_2O/Na_2O$ | 3.8 | 1.1 | 1.4 | 1.4 | 1.4 | 2.0 | 2 | 2 | 2.0 | 1.8 |
| $ZrO_2 + P_2O_5 + TiO_2$ | 2 | 2 | 5.0 | 3 | 2 | 4.0 | 2 | 2 | 5.0 | 2 |
| $ZrO_2/Li_2O$ | 0.07 | 0.22 | 0.10 | 0.10 | 0.10 | 0.20 | 0.10 | 0.20 | 0.20 | 0.09 |
| Liquidus temperature (° C.) | 1290° C. | 1280° C. | 1280° C. | 1290° C. | 1290° C. | 1280° C. | 1280° C. | 1290° C. | 1290° C. | 1290° C. |

TABLE 3-continued

| Component (wt %) | Embodiments 21 | 22 | 23 | 24 | 25 | 26 | 27 | 28 | 29 | 30 |
|---|---|---|---|---|---|---|---|---|---|---|
| Nucleus formation technology | 590° C. 6 h | 650° C. 10 h | 600° C. 6 h | 590° C. 10 h | 600° C. 10 h | 600° C. 6 h | 590° C. 10 h | 600° C. 10 h | 600° C. 6 h | 590° C. 10 h |
| Crystallization technology | 690° C. 2 h | | 690° C. 10 h | 710° C. 2 h | 710° C. 3 h | 710° C. 5 h | 730° C. 2 h | 730° C. 3 h | 730° C. 5 h | 730° C. 3 h |
| Crystalline phase | $Li_2Si_2O_5$, quartz and quartz solid solution and $LiAlSi_4O_{10}$ | $Li_2Si_2O_5$, $Na_2Si_2O_5$ | $Li_2Si_2O_5$, $Na_2Si_2O_5$ | $Li_2Si_2O_5$, $Na_2Si_2O_5$ | $Li_2Si_2O_5$, $Na_2Si_2O_5$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, $Na_2Si_2O_5$ |
| Chemical strengthening conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | 550 | — | — | — | 525 | 510 | 500 | 512 | 527 | — |
| Stress depth (μm) | 14 | — | — | — | 13 | 12 | 10 | 12 | 13 | — |
| Vickers hardness (kgf/mm$^2$) | 700 | 706 | 706 | 710 | 712 | 715 | 721 | 720 | 720 | 720 |
| Three-point bending strength (MPa) | 850 | 750 | 760 | 755 | 756 | 860 | 855 | 863 | 865 | 820 |
| Ball falling height (mm) | 800 | 700 | 700 | 700 | 700 | 800 | 850 | 850 | 850 | 800 |
| Thermal conductivity (W/(mK) | 2.5 | 2.1 | 2.2 | 2.2 | 2.1 | 2.6 | 2.7 | 2.5 | 2.5 | 2.7 |
| Color | Transparent | White | White | White | White | Transparent | Transparent | Transparent | Transparent | Transparent |

TABLE 4

| Component (wt %) | Embodiments 31 | 32 | 33 | 34 | 35 | 36 | 37 | 38 | 39 | 40 |
|---|---|---|---|---|---|---|---|---|---|---|
| $SiO_2$ | 70 | 70.5 | 71 | 71.5 | 72 | 72.5 | 73 | 73.5 | 74 | 74.5 |
| $Al_2O_3$ | 6 | 5 | 5 | 5 | 5 | 4 | 4 | 4 | 4 | 4 |
| $Li_2O$ | 11 | 11 | 12 | 12 | 12 | 13 | 13 | 14 | 14 | 15 |
| $Na_2O$ | 6 | 6 | 6 | 5 | 5 | 5 | 5 | 5 | 5 | 4 |
| $P_2O_5$ | | | | | | | 1 | | 0 | |
| $ZrO_2$ | 2 | 1 | 2 | 1 | 2 | 1 | 2 | 2 | 2 | 2 |
| $TiO_2$ | | 1 | | 1 | | | | | | |
| $B_2O_3$ | | 4 | | | | 3 | | | | |
| $K_2O$ | | | | 3 | 2 | | | 1 | | |
| MgO | | 1 | 1 | | 1 | | | 0.5 | | |
| ZnO | | | 1 | 0.5 | 0.5 | 0.5 | | | | |
| CaO | | | | | 0.5 | | | | | |
| BaO | 5 | | | | 1 | | | 3 | | 1 | |
| FeO | | 0.5 | 2 | | | | | | | 0.5 |
| SnO2 | | | | | | | | | | |
| SrO | | | | | | | | | | |
| $La_2O_3$ | | | | | | | | | | |
| $Y_2O_3$ | | | | | | | | | | |
| $Nb_2O_5$ | | | | | | | | | | |
| $Ta_2O_5$ | | | | | | | | | | |
| $WO_3$ | | | | | | | | | | |
| Total | 100 | 100 | 100 | 100 | 100 | 100 | 100 | 100 | 100 | 100 |
| $SiO_2/Li_2O$ | 6.4 | 6.4 | 5.9 | 6 | 6 | 5.6 | 5.6 | 5.3 | 5.3 | 5 |
| $Al_2O_3/(Na_2O + Li_2O)$ | 0.4 | 0.3 | 0.3 | 0.3 | 0.3 | 0.2 | 0.2 | 0.2 | 0.2 | 0.2 |
| $Li_2O/Na_2O$ | 1.8 | 1.8 | 2.0 | 2.4 | 2.4 | 2.6 | 2.6 | 2.8 | 2.8 | 3.8 |
| $ZrO_2 + P_2O_5 + TiO_2$ | 2 | 2 | 2 | 2 | 2 | 2 | 2 | 2 | 2 | 3 |
| $ZrO_2/Li_2O$ | 0.18 | 0.09 | 0.17 | 0.08 | 0.17 | 0.08 | 0.15 | 0.14 | 0.14 | 0.13 |
| Liquidus temperature (° C.) | 1290° C. | 1300° C. | 1300° C. | 1300° C. | 1300° C. | 1320° C. | 1320° C. | 1320° C. | 1320° C. | 1320° C. |
| Nucleus formation technology | 600° C. 10 h | 600° C. 6 h | 590° C. 10 h | 600° C. 10 h | 600° C. 6 h | 590° C. 10 h | 600° C. 10 h | 600° C. 6 h | 590° C. 10 h | 600° C. 10 h |

TABLE 4-continued

| Component (wt %) | Embodiments | | | | | | | | | |
|---|---|---|---|---|---|---|---|---|---|---|
| | 31 | 32 | 33 | 34 | 35 | 36 | 37 | 38 | 39 | 40 |
| Crystallization technology | 730° C. 4 h | 715° C. 5 h | 720° C. 6 h | 715° C. 2 h | 720° C. 2.5 h | 730° C. 3 h | 720° C. 4 h | 715° C. 6 h | 710° C. 6 h | 730° C. 2 h |
| Crystalline phase | $Li_2Si_2O_5$, $Na_2Si_2O_5$ | $Li_2Si_2O_5$, $Na_2Si_2O_5$ | $Li_2Si_2O_5$, $Na_2Si_2O_5$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ |
| Chemical tempering conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | — | — | — | — | — | — | — | — | — | — |
| Stress depth (μm) | — | — | — | — | — | — | — | — | — | — |
| Vickers hardness (kgf/mm$^2$) | 721 | 710 | 715 | 717 | 718 | 723 | 720 | 710 | 710 | 720 |
| Three-point bending strength (MPa) | 825 | 815 | 821 | 845 | 847 | 850 | 860 | 855 | 859 | 870 |
| Ball falling height (mm) | 750 | 750 | 750 | 850 | 850 | 850 | 800 | 800 | 800 | 850 |
| Thermal conductivity (W/(mK) | 2.4 | 2.3 | 2.3 | 2.5 | 2.6 | 2.5 | 2.7 | 2.5 | 2.6 | 2.3 |
| Color | Milky white | Milky white | Milky white | Transparent | Transparent | Transparent | Transparent | Transparent | Transparent | Transparent |

TABLE 5

| Component (wt %) | Embodiments | | | | | | | | | |
|---|---|---|---|---|---|---|---|---|---|---|
| | 41 | 42 | 43 | 44 | 45 | 46 | 47 | 48 | 49 | 50 |
| $SiO_2$ | 63.7 | 64 | 65 | 66.2 | 63 | 64 | 65 | 66 | 69 | 67.5 |
| $Al_2O_3$ | 7.8 | 7.5 | 8 | 7 | 6.5 | 6.8 | 6.7 | 6 | 6 | 5.8 |
| $Li_2O$ | 14 | 8.8 | 8 | 10 | 9.5 | 9 | 9 | 10 | 7 | 10.7 |
| $Na_2O$ | 3.5 | 7.8 | 5 | 6 | 6 | 3.5 | 4.8 | 4 | 5 | 5.5 |
| $P_2O_5$ | 1 | 0.4 | 2 | 1 | | 1 | 1 | | 0.8 | 1 |
| $ZrO_2$ | 2 | 2 | 2 | 1 | 1 | 1 | 1 | 1.5 | 1 | 1 |
| $TiO_2$ | | | 2 | 1 | 1 | 1 | 1 | 1 | | |
| $B_2O_3$ | 5 | | | | | | | | | |
| $K_2O$ | | 5 | 2 | 1 | 1 | | 0.5 | | | |
| MgO | | 1 | | 1 | 1 | 0.5 | | | | |
| ZnO | | 1 | 0.5 | 0.3 | | | 0.5 | 0.5 | | 0.5 |
| CaO | | | | | 1 | | | | | 5 |
| BaO | | | | | | | | | | |
| FeO | | | | | | | | | | |
| SnO2 | 1 | 0.5 | | | | | | | | |
| SrO | | | | 5 | | | | | | |
| $La_2O_3$ | | | | | | 8 | | | | |
| $Y_2O_3$ | | | 5 | | | | | | 8 | |
| $Nb_2O_5$ | | | | | | | | 8 | | |
| $Ta_2O_5$ | | | | | | | 7 | | | |
| $WO_3$ | | | | | 5 | | | | | |
| NiO | 2 | 1 | | | | 0.1 | | | 0.1 | |
| $Ni_2O_3$ | | 1 | | | | | | | | |
| CoO | | | 0.5 | | | 0.1 | | | 0.1 | |
| $Co_2O_3$ | | | | 0.5 | | | | | | |
| $Fe_2O_3$ | | | | | 5 | 5 | 3.5 | 3 | 3 | |
| $MnO_2$ | | | | | | | | | | 3 |
| $Er_2O_3$ | | | | | | | | | | |
| $Nd_2O_3$ | | | | | | | | | | |
| $Cu_2O$ | | | | | | | | | | |
| $Pr_2O_5$ | | | | | | | | | | |
| $CeO_2$ | | | | | | | | | | |
| $V_2O_5$ | | | | | | | | | | |
| $Cr_2O_3$ | | | | | | | | | | |
| Total | 100 | 100 | 100 | 100 | 100 | 100 | 100 | 100 | 100 | 100 |
| $SiO_2/Li_2O$ | 4.6 | 7.3 | 8.1 | 6.6 | 6.6 | 7.1 | 7.2 | 6.6 | 9.9 | 6.3 |
| $Al_2O_3/(Na_2O + Li_2O)$ | 0.4 | 0.5 | 0.6 | 0.4 | 0.4 | 0.5 | 0.5 | 0.4 | 0.5 | 0.4 |

TABLE 5-continued

| Component (wt %) | Embodiments | | | | | | | | | |
|---|---|---|---|---|---|---|---|---|---|---|
| | 41 | 42 | 43 | 44 | 45 | 46 | 47 | 48 | 49 | 50 |
| $Li_2O/Na_2O$ | 4.0 | 1.1 | 1.6 | 1.7 | 1.6 | 2.6 | 1.9 | 2.5 | 1.4 | 1.9 |
| $ZrO_2 + P_2O_5 + TiO_2$ | 3 | 2.4 | 6 | 3 | 2 | 3 | 3 | 2.5 | 1.8 | 2 |
| $ZrO_2/Li_2O$ | 0.14 | 0.23 | 0.25 | 0.10 | 0.11 | 0.11 | 0.11 | 0.15 | 0.14 | 0.09 |
| Liquidus temperature (° C.) | 1280° C. | 1280° C. | 1260° C. | 1280° C. | 1290° C. | 1260° C. | 1260° C. | 1280° C. | 1260° C. | 1290° C. |
| Nucleus formation technology | 590° C. 6 h | 600° C. 10 h | 600° C. 6 h | 590° C. 10 h | 600° C. 10 h | 600° C. 6 h | 590° C. 10 h | 600° C. 10 h | 600° C. 6 h | 590° C. 10 h |
| Crystallization technology | 690° C. 2 h | 690° C. 6 h | 690° C. 10 h | 710° C. 2 h | 710° C. 3 h | 710° C. 5 h | 730° C. 2 h | 730° C. 3 h | 730° C. 5 h | 730° C. 3 h |
| Crystalline phase | $Li_2Si_2O_5$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O$ | $Li_2Si_2O_5$, quartz and quartz solid solution and $LiAlSi_4O_{10}$ | $Li_2Si_2O_5$ | $Li_2Si_2O_5$ | $Li_2Si_2O_5$ | $Li_2Si_2O_5$ | $Li_2Si_2O_5$, quartz and quartz solid solution and $LiAlSi_4O_{10}$ |
| Chemical tempering conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | — | — | — | — | — | — | — | — | — | — |
| Stress depth (μm) | — | — | — | — | — | — | — | — | — | — |
| Vickers hardness (kgf/mm$^2$) | — | — | — | — | — | — | — | — | — | — |
| Three-point bending strength (MPa) | 800 | 950 | 850 | 845 | 855 | 84 | 850 | 825 | 823 | 830 |
| Ball falling height (mm) | 800 | 800 | 800 | 750 | 750 | 750 | 700 | 700 | 700 | 700 |
| Thermal conductivity (W/(mK) | 2.4 | 2.4 | 2.3 | 2.3 | 2.3 | 2.5 | 2.6 | 2.6 | 2.5 | 2.3 |
| Color | Green | Green | Blue | Blue | Black | Black | Black | Black | Black | Violet |

TABLE 6

| Component (wt %) | Embodiments | | | | | | | | | |
|---|---|---|---|---|---|---|---|---|---|---|
| | 51 | 52 | 53 | 54 | 55 | 56 | 57 | 58 | 59 | 60 |
| $SiO_2$ | 64.5 | 65 | 71 | 68 | 66.5 | 71 | 67.5 | 72 | 70 | 70 |
| $Al_2O_3$ | 5.5 | 4.5 | 5 | 5 | 4.5 | 4 | 5 | 6 | 6 | 4 |
| $Li_2O$ | 10 | 10 | 10 | 8 | 9.5 | 10 | 8 | 8 | 12 | 15 |
| $Na_2O$ | 5.5 | 5.5 | 4 | 5 | 4.5 | 5 | 5 | 8 | 5 | 4 |
| $P_2O_5$ | | 0.8 | | | 1 | 0.5 | 1.5 | 2 | 1 | |
| $ZrO_2$ | 2 | 1 | 2 | 1 | 1 | 2 | 2 | 1 | 2 | 3 |
| $TiO_2$ | | 0.2 | | 1 | 1 | 2 | | | | 2 |
| $B_2O_3$ | | 3.5 | | | | 3 | | | | |
| $K_2O$ | | | | 1 | 2 | | | 1 | | |
| MgO | | 1 | 1 | | 1 | | | | | |
| ZnO | | | 1 | 0.5 | 0.5 | 0.5 | | | | |
| CaO | | | | | 0.5 | | | | | |
| BaO | 4.5 | | | 1 | | | 3 | | 1 | |
| FeO | | 0.5 | 2 | | | | | | | 1 |
| SnO2 | | | | | | | | | | |
| SrO | | | | | | | | | | |
| $La_2O_3$ | | | | | | | | | | |
| $Y_2O_3$ | | | | | | | | | | |
| $Nb_2O_5$ | | | | | | | | | | |
| $Ta_2O_5$ | | | | | | | | | | |
| $WO_3$ | | | | | | | | | | |
| NiO | | | | | | | | | | |
| $Ni_2O_3$ | | | | | | | | | | |
| CoO | | | | | | | | | | |
| $Co_2O_3$ | | | | | | | | | | |
| $Fe_2O_3$ | | | | | | | | | | |
| $MnO_2$ | | | | | 1.5 | 2 | | | | |
| $Er_2O_3$ | 8 | | | 4 | | 3 | | | | |
| $Nd_2O_3$ | | 8 | 4 | 4 | | 3 | | | | |
| $Cu_2O$ | | | | | | | 2 | | | |
| $Pr_2O_5$ | | | | | | | | 8 | | |

TABLE 6-continued

| Component | Embodiments | | | | | | | | | |
|---|---|---|---|---|---|---|---|---|---|---|
| (wt %) | 51 | 52 | 53 | 54 | 55 | 56 | 57 | 58 | 59 | 60 |
| $CeO_2$ | | | | | | | | 2 | | |
| $V_2O_5$ | | | | | | | | | 3 | |
| $Cr_2O_3$ | | | | | | | | | | 1 |
| Total | 100 | 100 | 100 | 100 | 100 | 100 | 100 | 100 | 100 | 100 |
| $SiO_2/Li_2O$ | 6.5 | 6.5 | 7.1 | 8.5 | 7.0 | 7.1 | 8.4 | 9.0 | 5.8 | 4.7 |
| $Al_2O_3/(Na_2O + Li_2O)$ | 0.4 | 0.3 | 0.4 | 0.4 | 0.3 | 0.3 | 0.4 | 0.4 | 0.4 | 0.2 |
| $Li_2O/Na_2O$ | 1.8 | 1.8 | 2.5 | 1.6 | 2.1 | 2 | 1.6 | 1 | 2.4 | 3.8 |
| $ZrO_2 + P_2O_5 + TiO_2$ | 2 | 2 | 2 | 2 | 2 | 4.5 | 3.5 | 3 | 3 | 5 |
| $ZrO_2/Li_2O$ | 0.20 | 0.10 | 0.20 | 0.13 | 0.11 | 0.20 | 0.25 | 0.13 | 0.17 | 0.20 |
| Liquidus temperature (° C.) | 1290° C. | 1300° C. | 1290° C. | 1280° C. | 1290° C. | 1300° C. | 1280° C. | 1280° C. | 1290° C. | 1350° C. |
| Nucleus formation technology | 600° C. 10 h | 600° C. 6 h | 600° C. 10 h | 600° C. 10 h | 600° C. 6 h | 590° C. 10 h | 600° C. 10 h | 600° C. 6 h | 590° C. 10 h | 600° C. 10 h |
| Crystallization technology | 730° C. 4 h | 715° C. 5 h | 720° C. 6 h | 715° C. 2 h | 720° C. 2.5 h | 730° C. 3 h | 720° C. 4 h | 715° C. 6 h | 710° C. 6 h | 730° C. 2 h |
| Crystalline phase | $Li_2Si_2O_5$ | $Li_2Si_2O_5$, quartz and quartz solid solution and $LiAlSi_4O_{10}$ | $Li_2Si_2O_5$ | $Li_2Si_2O_5$, quartz and quartz solid solution and $LiAlSi_4O_{10}$ | $Li_2Si_2O_5$ | $Li_2Si_2O_5$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ |
| Chemical tempering conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | — | — | — | — | — | — | — | — | — | — |
| Stress depth (μm) | — | — | — | — | — | — | — | — | — | — |
| Vickers hardness (kgf/mm$^2$) | — | — | — | — | — | — | — | — | — | — |
| Three-point bending strength (MPa) | 835 | 832 | 823 | 833 | 825 | 850 | 860 | 900 | 850 | 833 |
| Ball falling height (mm) | 700 | 750 | 750 | 750 | 750 | 700 | 750 | 750 | 800 | 700 |
| Thermal conductivity (W/(mK) | 2.6 | 2.5 | 2.6 | 2.7 | 2.8 | 2.6 | 2.8 | 2.3 | 2.5 | 2.5 |
| Color | Pink | Mauve | Mauve | Red | Red | Yellow | Grass green | Yellow | Yellow green | Green |

TABLE 7

| Component | Embodiments | | | | | | | | | |
|---|---|---|---|---|---|---|---|---|---|---|
| (wt %) | 61 | 62 | 63 | 64 | 65 | 66 | 67 | 68 | 69 | 70 |
| $SiO_2$ | 70 | 69.5 | 70 | 70 | 71 | 70 | 70 | 70 | 69.5 | 70 |
| $Al_2O_3$ | 8 | 7.5 | 8 | 7 | 7.5 | 7 | 7 | 7 | 9 | 9 |
| $Li_2O$ | 8 | 8.5 | 8.5 | 9 | 9 | 9.5 | 10 | 9 | 9.5 | 10 |
| $Na_2O$ | 6 | 6 | 5 | 3 | 5.5 | 6 | 5 | 4 | 2 | 2 |
| $P_2O_5$ | 2 | 2 | 2 | 2 | 2 | 2 | 2 | 1 | 2 | 2 |
| $ZrO_2$ | 1 | 2 | 1 | 1 | 1 | 1 | 1 | 2 | 2 | 1 |
| $TiO_2$ | | | | | | | | | | |
| $B_2O_3$ | | | | | | 1 | | | | |
| $K_2O$ | 1 | | 0.5 | | | | | | | |
| MgO | 1 | 0.5 | | | 1 | | | | | |
| ZnO | 1 | | | | | | | | | |
| CaO | | | | | | 0.5 | | | | |
| BaO | | | | | | | | | | 1 |
| SrO | | | | | | | | | 1 | |
| $La_2O_3$ | 2 | 4 | 5 | 8 | | | | | 2 | 3 |
| $Y_2O_3$ | | | | | 2 | 4 | 5 | 7 | 3 | 2 |
| Total | 100 | 100 | 100 | 100 | 100 | 100 | 100 | 100 | 100 | 100 |
| $SiO_2/Li_2O$ | 8.8 | 8.2 | 8.2 | 7.8 | 7.9 | 7.4 | 7 | 7.8 | 7.3 | 7 |
| $Al_2O_3/(Na_2O + Li_2O)$ | 0.6 | 0.5 | 0.6 | 0.6 | 0.5 | 0.5 | 0.5 | 0.5 | 0.8 | 0.8 |
| $Li_2O/Na_2O$ | 1.3 | 1.4 | 1.7 | 3 | 1.6 | 1.6 | 2 | 2.3 | 4.8 | 5 |
| $ZrO_2 + P_2O_5 + TiO_2$ | 3 | 4 | 3 | 3 | 3 | 3 | 3 | 3 | 4 | 3 |
| $ZrO_2/Li_2O$ | 0.13 | 0.24 | 0.12 | 0.11 | 0.11 | 0.11 | 0.10 | 0.22 | 0.21 | 0.10 |

TABLE 7-continued

| Component (wt %) | Embodiments | | | | | | | | | |
|---|---|---|---|---|---|---|---|---|---|---|
| | 61 | 62 | 63 | 64 | 65 | 66 | 67 | 68 | 69 | 70 |
| Liquidus temperature (° C.) | 1260° C. | 1260° C. | 1240° C. | 1220° C. | 1250° C. | 1260° C. | 1260° C. | 1230° C. | 1220° C. | 1220° C. |
| Nucleus formation technology | 550° C. 6 h | 550° C. 8 h | 550° C. 10 h | 550° C. 6 h | 550° C. 8 h | 550° C. 10 h | 550° C. 6 h | 550° C. 8 h | 550° C. 10 h | 550° C. 8 h |
| Crystallization technology | 690° C. 2 h | 690° C. 2 h | 690° C. 2 h | 690° C. 2 h | 690° C. 2 h | 690° C. 2 h | 690° C. 2 h | 690° C. 2 h | 690° C. 2 h | 690° C. 2 h |
| Crystalline phase | $Li_2Si_2O_5$ | $Li_2Si_2O_5$ | $Li_2Si_2O_5$ | $Li_2Si_2O_5$, quartz and quartz solid solution and $LiAlSi_4O_{10}$ | $Li_2Si_2O_5$ | $Li_2Si_2O_5$ | $Li_2Si_2O_5$ | $Li_2Si_2O_5$, quartz and quartz solid solution and $LiAlSi_4O_{10}$ | $Li_2Si_2O_5$, quartz and quartz solid solution and $LiAlSi_4O_{10}$ | $Li_2Si_2O_5$, quartz and quartz solid solution and $LiAlSi_4O_{10}$ |
| Chemical strengthening conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | — | — | — | 710 | — | — | — | 730 | 650 | 660 |
| Stress depth (μm) | — | — | — | 12 | — | — | — | 13 | 10 | 10 |
| Vickers hardness (kgf/mm²) | 719 | 736 | 742 | 751 | 724 | 736 | 742 | 755 | 735 | 739 |
| Three-point bending strength (MPa) | 813 | 809 | 818 | 854 | 802 | 824 | 828 | 866 | 832 | 843 |
| Ball falling height (mm) | 850 | 850 | 850 | 950 | 800 | 800 | 800 | 950 | 850 | 850 |
| Thermal conductivity (W/(mK)) | 2.1 | 2.1 | 2.2 | 2.4 | 2.3 | 2.2 | 2.3 | 2.4 | 2.6 | 2.5 |
| Color | White | White | White | Transparent | White | White | White | Transparent | Transparent | Transparent |

TABLE 8

| Component (wt %) | Embodiments | | | | | | | | | |
|---|---|---|---|---|---|---|---|---|---|---|
| | 71 | 72 | 73 | 74 | 75 | 76 | 77 | 78 | 79 | 80 |
| $SiO_2$ | 65 | 68 | 67 | 68 | 69 | 70 | 67 | 65 | 67 | 67 |
| $Al_2O_3$ | 8 | 6 | 7 | 6 | 6.5 | 5 | 7 | 5 | 5 | 9 |
| $Li_2O$ | 8 | 8.5 | 8.5 | 9 | 9 | 9.5 | 10 | 9 | 9 | 9 |
| $Na_2O$ | 6 | 6 | 5 | 3 | 5.5 | 6 | 5 | 4 | 4 | 4 |
| $P_2O_5$ | 2 | 2 | 2 | 2 | 2 | 2 | 2 | 1 | | 1 |
| $ZrO_2$ | 1 | 2 | 1 | 1 | 1 | 1 | 1 | 2 | 2 | 1 |
| $TiO_2$ | 3 | 3 | 4 | 5 | 5 | 6 | 6 | 7 | 8 | 9 |
| $B_2O_3$ | | | | | 1 | | | | | |
| $K_2O$ | 1 | | 0.5 | | | | | 2 | 1 | |
| MgO | 1 | 0.5 | | | 1 | | | 1 | 1 | |
| ZnO | 1 | | | | | | | 1 | 1 | |
| CaO | | | | | | | 0.5 | | | |
| BaO | | | | | | | | 1 | | |
| SrO | | | | | | | | 1 | | |
| $La_2O_3$ | 1 | 4 | 5 | 3 | | | | | 2 | |
| $Y_2O_3$ | 3 | | | 3 | | | 2 | 1 | | |
| Total | 100 | 100 | 100 | 100 | 100 | 100 | 100 | 100 | 100 | 100 |
| $SiO_2/Li_2O$ | 8.1 | 8 | 7.9 | 7.6 | 7.7 | 7.4 | 6.7 | 7.2 | 7.4 | 7.4 |
| $Al_2O_3/(Na_2O + Li_2O)$ | 0.6 | 0.4 | 0.5 | 0.5 | 0.4 | 0.3 | 0.5 | 0.4 | 0.4 | 0.7 |
| $Li_2O/Na_2O$ | 1.3 | 1.4 | 1.7 | 3 | 1.6 | 1.6 | 2 | 2.3 | 2.3 | 2.3 |
| $ZrO_2 + P_2O_5 + TiO_2$ | 6 | 7 | 7 | 8 | 8 | 9 | 9 | 10 | 10 | 11 |
| $ZrO_2/Li_2O$ | 0.13 | 0.24 | 0.12 | 0.11 | 0.11 | 0.11 | 0.10 | 0.22 | 0.22 | 0.11 |
| Liquidus temperature (° C.) | 1100 | 1080 | 1060 | 1030 | 1020 | 1040 | 1050 | 1090 | 1100 | 1150 |
| viscosity at liquidus temperature (P) | 6250 | 9140 | 13000 | 19200 | 21400 | 17100 | 15000 | 7300 | 5360 | 3500 |

TABLE 8-continued

| Component (wt %) | 71 | 72 | 73 | 74 | 75 | 76 | 77 | 78 | 79 | 80 |
|---|---|---|---|---|---|---|---|---|---|---|
| Nucleus formation technology | 550° C. 6 h | 550° C. 8 h | 550° C. 10 h | 550° C. 6 h | 550° C. 8 h | 550° C. 10 h | 550° C. 6 h | 550° C. 8 h | 550° C. 10 h | 550° C. 8 h |
| Crystallization technology | 690° C. 2 h | 690° C. 2 h | 690° C. 2 h | 690° C. 2 h | 690° C. 2 h | 690° C. 2 h | 690° C. 2 h | 690° C. 2 h | 690° C. 2 h | 690° C. 2 h |
| Crystalline phase | $Li_2Si_2O_5$ | $Li_2Si_2O_5$ | $Li_2Si_2O_5$, $Li_2TiO_3$ | $Li_2Si_2O_5$, $Li_2TiO_3$ | $Li_2Si_2O_5$, $Li_2TiO_3$ | $Li_2Si_2O_5$, $Li_2TiO_3$ | $Li_2Si_2O_5$, $Li_2TiO_3$ | $Li_2Si_2O_5$, $Li_2TiO_3$ | $Li_2Si_2O_5$, $Li_2TiO_3$ | $Li_2Si_2O_5$, $Li_2TiO_3$ |
| Chemical strengthening conditions | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h | 430° C. 8 h |
| Surface stress (MPa) | — | — | — | 710 | — | — | — | 730 | 650 | 660 |
| Stress depth (μm) | — | — | — | 12 | — | — | — | 13 | 10 | 10 |
| Vickers hardness (kgf/mm$^2$) | 722 | 743 | 745 | 760 | 712 | 705 | 721 | 723 | 731 | 716 |
| Three-point bending strength (MPa) | 817 | 820 | 818 | 860 | 800 | 817 | 830 | 880 | 885 | 825 |
| Ball falling height (mm) | 850 | 850 | 850 | 950 | 850 | 850 | 850 | 900 | 850 | 850 |
| Thermal conductivity (W/(mK) | 2.1 | 2.1 | 2.1 | 2.3 | 2.3 | 2.2 | 2.3 | 2.3 | 2.5 | 2.4 |
| Color | White | White | White | Transparent | White | White | White | Transparent | Transparent | Transparent |

As can be seen in the above embodiments, the glass ceramic of the present invention has the thermal conductivity above 2 W/m·k at room temperature (25° C.), thereby having high thermal conductivity, and good bending strength, hardness and resistance to damage. Meanwhile, the glass ceramic of the present invention can also have individualized colors. The glass ceramic or the substrate of the present invention is applicable to such protective components as portable electronic devices and optical devices, especially as back cover plate.

The invention claimed is:

1. A glass ceramic, comprising, by wt %: 60 to 80% of $SiO_2$; 4 to 20% of $Al_2O_3$; more than 0 but less than or equal to 15% of $Li_2O$; more than 0 but less than or equal to 12% of $Na_2O$; 0 to 5% of $K_2O$; more than 0 but less than or equal to 5% of $ZrO_2$; 0 to 5% of $P_2O_5$; and 0 to 10% of $TiO_2$; and
a crystalline phase containing $LiAlSi_4O_{10}$, quartz, and quartz solid solution,
wherein the quartz and the quartz solid solution crystalline phase account for 15 to 30% of the glass ceramic by wt %, the $LiAlSi_4O_{10}$ crystalline phase accounts for not greater than 15% of the glass ceramic by wt %, and
wherein a ratio of $ZrO_2/Li_2O$ is more than 0 but less than or equal to 0.35.

2. The glass ceramic according to claim 1, further comprising more than 0 but less than or equal to 5% of $B_2O_3$; and/or more than 0 but less than or equal to 2% of MgO; and/or more than 0 but less than or equal to 2% of ZnO; and/or more than 0 but less than or equal to 5% of CaO; and/or more than 0 but less than or equal to 5% of BaO; and/or more than 0 but less than or equal to 3% of FeO; and/or more than 0 but less than or equal to 2% of $SnO_2$; and/or more than 0 but less than or equal to 5% of SrO; and/or more than 0 but less than or equal to 10% of $La_2O_3$; and/or more than 0 but less than or equal to 10% of $Y_2O_3$; and/or to 10% of $Nb_2O_5$; and/or more than 0 but less than or equal to 10% of $Ta_2O_5$; and/or more than 0 but less than or equal to 5% of $WO_3$.

3. The glass ceramic according to claim 1, consisting of 60 to 80% of $SiO_2$; 4 to 20% of $Al_2O_3$; more than 0 but less than or equal to 15% of $Li_2O$; more than 0 but less than or equal to 12% of $Na_2O$; more than 0 but less than or equal to 5% of $ZrO_2$; and one or more selected from the group consisting of more than 0 but less than or equal to 5% of $P_2O_5$, more than 0 but less than or equal to 10% of $TiO_2$, more than 0 but less than or equal to 5% of $B_2O_3$, more than 0 but less than or equal to 5% of $K_2O$, more than 0 but less than or equal to 2% of MgO, more than 0 but less than or equal to 2% of ZnO, more than 0 but less than or equal to 5% of CaO, more than 0 but less than or equal to 5% of BaO, more than 0 but less than or equal to 3% of FeO, more than 0 but less than or equal to 2% of $SnO_2$, more than 0 but less than or equal to 5% of SrO, more than 0 but less than or equal to 10% of $La_2O_3$, more than 0 but less than or equal to 10% of $Y_2O_3$, more than 0 but less than or equal to 10% of $Nb_2O_5$, more than 0 but less than or equal to 10% of $Ta_2O_5$, more than 0 but less than or equal to 5% of $WO_3$, more than 0 but less than or equal to 5% of a clarificant.

4. The glass ceramic according to claim 1, wherein $SiO_2$ accounts for 65 to 78%; and/or $Al_2O_3$ accounts for 5 to 18%; and/or more than 0 but less than or equal to 12% of $Li_2O$; and/or $Na_2O$ accounts for 0.5 to 10%; and/or $ZrO_2$ accounts for 0.4 to 3%; and/or $P_2O_5$ accounts for 0.4 to 3%; and/or $B_2O_3$ accounts for 0 to 4%; and/or $K_2O$ accounts for 0.5 to 4%; and/or MgO accounts for more than 0 but less than or equal to 2%; and/or ZnO accounts for more than 0 but less than or equal to 2%; and/or CaO accounts for 0 to 4%; and/or BaO accounts for 0 to 4%; and/or FeO accounts for 0 to 1%; and/or $SnO_2$ accounts for 0.01 to 1%; and/or SrO accounts for 0 to 3%; and/or $La_2O_3$ accounts for 0 to 9%; and/or $Y_2O_3$ accounts for 0 to 9%; and/or $Nb_2O_5$ accounts for 0 to 8%; and/or $Ta_2O_5$ accounts for 0 to 8%; and/or $WO_3$ accounts for 0 to 2%; and/or the clarificant contains $As_2O_3$, $Sb_2O_3$, and $CeO_2$ and at least one selected from F, Cl, NOx, and SOx with a content of 0 to 5%.

5. The glass ceramic according to claim 1, wherein $SiO_2/Li_2O$ ratio is 4 to 10; and/or $ZrO_2/Li_2O$ ratio is greater than 0 but less than or equal to 0.3; and/or $Al_2O_3/(Na_2O+Li_2O)$ ratio is 0.5 to 2; and/or $Li_2O/Na_2O$ ratio is 0.8 to 8.

6. The glass ceramic according to claim 3, wherein $SiO_2$ accounts for 68 to 75%; and/or $Al_2O_3$ accounts for 6 to 15%; and/or $Li_2O$ accounts for 6 to 10%; and/or $Na_2O$ accounts for 2 to 8%; and/or $ZrO_2$ accounts for 0.8 to 2%; and/or $P_2O_5$ accounts for 0.8 to 2%; and/or $TiO_2$ accounts for 1 to 4%; and/or $B_2O_3$ accounts for greater than 0% but less than 2%; and/or $K_2O$ accounts for 0.8 to 3%; and/or $CaO$ accounts for 0 to 3%; and/or $BaO$ accounts for 0 to 3%; and/or $SnO_2$ accounts for 0.05 to 0.4%; and/or $SrO$ accounts for 0 to 1%; and/or $La_2O_3$ accounts for greater than 0 but less than or equal to 8%; and/or $Y_2O_3$ accounts for greater than 0 but less than or equal to 8%; and/or $Nb_2O_5$ accounts for 0 to 5%; and/or $Ta_2O_5$ accounts for 0 to 5%; and/or $WO_3$ accounts for 0 to 1%; and/or the clarificant accounts for 0 to 2%.

7. The glass ceramic according to claim 1, wherein $SiO_2/Li_2O$ ratio is 4.5 to 9.5; and/or $ZrO_2/Li_2O$ ratio is greater than 0 but less than 0.35; and/or $Al_2O_3/(Na_2O+Li_2O)$ ratio is 0.7 to 1.8; and/or $Li_2O/Na_2O$ ratio is 1.5 to 7.5.

8. The glass ceramic according to claim 1, wherein $Na_2O$ accounts for 4 to 8%, and/or $Al_2O_3$ accounts for 7 to 15%; and/or $ZrO_2$ accounts for 1 to 2%; and/or $P_2O_5$ accounts for 1 to 2%; and/or $K_2O$ accounts for 1 to 3%; and/or $CaO$ accounts for 0 to 1%; and/or $BaO$ accounts for 0 to 1%; and/or $SnO_2$ accounts for 0.05 to 0.2%; and/or the clarificant accounts for 0 to 1%; and/or $SiO_2/Li_2O$ ratio is 5 to 9; and/or $ZrO_2/Li_2O$ ratio is greater than 0 but less than or equal to 0.30; and/or $Al_2O_3/(Na_2O+Li_2O)$ ratio is 1 to 1.5; and/or $Li_2O/Na_2O$ ratio is 2 to 7.

9. The glass ceramic according to claim 1, wherein $TiO_2$ accounts for 0.5 to 5%, and/or $ZrO_2+P_2O_5+TiO_2$ account for 0.5 to 10%.

10. The glass ceramic according to claim 1, wherein $TiO_2$ accounts for 1.5 to 4%, and/or $ZrO_2+P_2O_5+TiO_2$ account for 2 to 6%.

11. The glass ceramic according to claim 1, further containing NiO and/or $Ni_2O_3$ with total amount thereof not greater than 6%, and a lower limit of the total amount thereof greater than 0.1%; or containing $Pr_2O_5$ with content not greater than 8%, and a lower limit of the content thereof greater than 0.4%; or containing CoO and/or $Co_2O_3$ with total amount thereof not greater than 2%, and a lower limit of the total amount thereof greater than 0.05%; or contains $Cu_2O$ and/or $CeO_2$ with total amount thereof not greater than 4%, and a lower limit of the total amount thereof greater than 0.5%; or containing $Fe_2O_3$ with content not greater than 8%, or containing $Fe_2O_3$ and CoO with CoO not greater than 0.3%; or containing $Fe_2O_3$ and $Co_2O_3$ with $Co_2O_3$ not greater than 0.3%; or containing $Fe_2O_3$, CoO and NiO; or containing $Fe_2O_3$, $Co_2O_3$ and NiO; or containing $Fe_2O_3$, CoO and $Co_2O_3$ with a lower limit of the total amount of CoO and $Co_2O_3$ greater than 0.2%; or containing $Fe_2O_3$, CoO, NiO and $Co_2O_3$; or containing $MnO_2$ with content not greater than 4%, and lower limit of the content greater than 0.1%; or containing $Er_2O_3$ with content not greater than 8%, and a lower limit of the content thereof greater than 0.4%; or containing $Nd_2O_3$ with content not greater than 8%, and a lower limit of the content thereof greater than 0.4%; or containing $Er_2O_3$, $Nd_2O_3$ and $MnO_2$ with $Er_2O_3$ content within 6%, $Nd_2O_3$ content within 4%, and $MnO_2$ content within 2%, and a lower limit of the total amount thereof greater than 0.9%; or containing $Cr_2O_3$ with content not greater than 4%, and a lower limit of the content thereof greater than 0.2%; or containing $V_2O_5$ with content not greater than 4%, and a lower limit of the content thereof greater than 0.2%.

12. The glass ceramic according to claim 1, wherein a $Li_2Si_2O_5$ crystalline phase accounts for 20 to 40% of the glass ceramic by wt %.

13. The glass ceramic according to claim 12, wherein the $Li_2Si_2O_5$ crystalline phase and the quartz and the quartz solid solution crystalline phase are main crystalline phases, the total content thereof is lower than 50% of the glass ceramic by wt %.

14. The glass ceramic according to claim 1, wherein a thermal conductivity of the glass is above 2 W/m·k at room temperature (25° C.).

15. A portable electronic device, containing the glass ceramic according to claim 1.

16. The glass ceramic according to claim 11, containing NiO and/or $Ni_2O_3$ with total amount thereof not greater than 4%; or containing $Pr_2O_5$ with content not greater than 6%; or containing CoO and/or $Co_2O_3$ with total amount thereof not greater than 1.8%; or contains $Cu_2O$ and/or $CeO_2$ with total amount thereof not greater than 3%; or containing $Fe_2O_3$ with content not greater than 5%; or containing $MnO_2$ with content not greater than 3%; or containing $Er_2O_3$ with content not greater than 6%; or containing $Nd_2O_3$ with content not greater than 6%; or containing $Cr_2O_3$ with content not greater than 3%; or containing $V_2O_5$ with content not greater than 3%.

17. The glass ceramic according to claim 16, containing NiO and/or $Ni_2O_3$ with total amount thereof not greater than 3%; or containing $Pr_2O_5$ with content not greater than 5%; or containing $Fe_2O_3$ with content not greater than 3%; or containing $Cr_2O_3$ with content not greater than 2%; or containing $V_2O_5$ with content not greater than 2%.

18. The glass ceramic according to claim 12, wherein the $Li_2Si_2O_5$ crystalline phase accounts for 20 to 35% of the glass ceramic by wt %.

19. The glass ceramic according to claim 18, wherein the $Li_2Si_2O_5$ crystalline phase accounts for 20 to 30% of the glass ceramic by wt %.

20. The glass ceramic according to claim 19, wherein the $Li_2Si_2O_5$ crystalline phase accounts for 20 to 25% of the glass ceramic by wt %.

21. The glass ceramic according to claim 13, wherein the quartz and the quartz solid solution crystalline phase account for 20 to 30% of the glass ceramic by wt %.

22. The glass ceramic according to claim 21, wherein the quartz and the quartz solid solution crystalline phase accounts for 25 to 30% of the glass ceramic by wt %.

23. The glass ceramic according to claim 13, wherein the $Li_2Si_2O_5$ crystalline phase and the quartz and the quartz solid solution crystalline phase are main crystalline phases, the total content thereof is lower than 46% of the glass ceramic by wt %.

* * * * *